United States Patent
Tsunoda et al.

(10) Patent No.: US 11,481,630 B2
(45) Date of Patent: Oct. 25, 2022

(54) MACHINING CONDITION ADJUSTMENT DEVICE AND MACHINING CONDITION ADJUSTMENT SYSTEM

(71) Applicant: FANUC CORPORATION, Yamanashi (JP)

(72) Inventors: Hirohide Tsunoda, Yamanashi (JP); Wataru Shiraishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 424 days.

(21) Appl. No.: 16/799,887

(22) Filed: Feb. 25, 2020

(65) Prior Publication Data

US 2020/0279158 A1 Sep. 3, 2020

(30) Foreign Application Priority Data

Feb. 28, 2019 (JP) .............................. JP2019-035779

(51) Int. Cl.
*G06N 3/08* (2006.01)
*G05B 19/4065* (2006.01)
*G06N 20/00* (2019.01)

(52) U.S. Cl.
CPC ........... *G06N 3/08* (2013.01); *G05B 19/4065* (2013.01); *G06N 20/00* (2019.01)

(58) Field of Classification Search
CPC ....... G06N 3/08; G06N 20/00; G05B 19/4065
USPC ........................................ 706/25, 12, 15, 16
See application file for complete search history.

(56) References Cited

U.S. PATENT DOCUMENTS

| | | | |
|---|---|---|---|
| 6,501,997 B1 | 12/2002 | Kakino | |
| 10,635,091 B2 * | 4/2020 | Sato | ..................... G05B 19/416 |
| 2017/0031330 A1 | 2/2017 | Shiraishi et al. | |
| 2018/0164756 A1 | 6/2018 | Yamaguchi | |
| 2018/0246494 A1 | 8/2018 | Nakahama | |

FOREIGN PATENT DOCUMENTS

| | | |
|---|---|---|
| JP | H11156672 A | 6/1999 |
| JP | 201042499 A | 2/2010 |
| JP | 2017030152 A | 2/2017 |
| JP | 201897680 A | 6/2018 |
| JP | 2018138327 A | 9/2018 |

* cited by examiner

*Primary Examiner* — Thjuan K Addy
(74) *Attorney, Agent, or Firm* — Hauptman Ham, LLP

(57) ABSTRACT

A machining condition adjustment device includes a data acquisition unit that acquires at least one piece of data indicating a state of machining including a machining type in a machine tool, a priority condition storage unit that stores priority condition data in which the machining type is associated with a priority condition, a preprocessing unit that produces data to be used for machine learning, and a machine learning device that carries out processing of the machine learning related to at least either of a machining condition and a machining parameter for machining by the machine tool. The machine learning device includes a learning model storage unit that stores a plurality of learning models generated for each machining type and a learning model selection unit that selects a learning model, based on the machining type.

10 Claims, 12 Drawing Sheets

FIG.3

| MACHINING TYPE | PRIORITY CONDITION |
|---|---|
| ROUGHING | HIGH CYCLE TIME |
| FINISHING | SHAPE PRECISION (PRIORITY), CYCLE TIME |
| PROFILE MACHINING | HIGH QUALITY, SURFACE QUALITY |
| DRILLING | PITCH ERROR <$Err_{pit}$ |
| TAPPING | TAP SURFACE ERROR <$Err_{tap}$ |
| ... | ... |

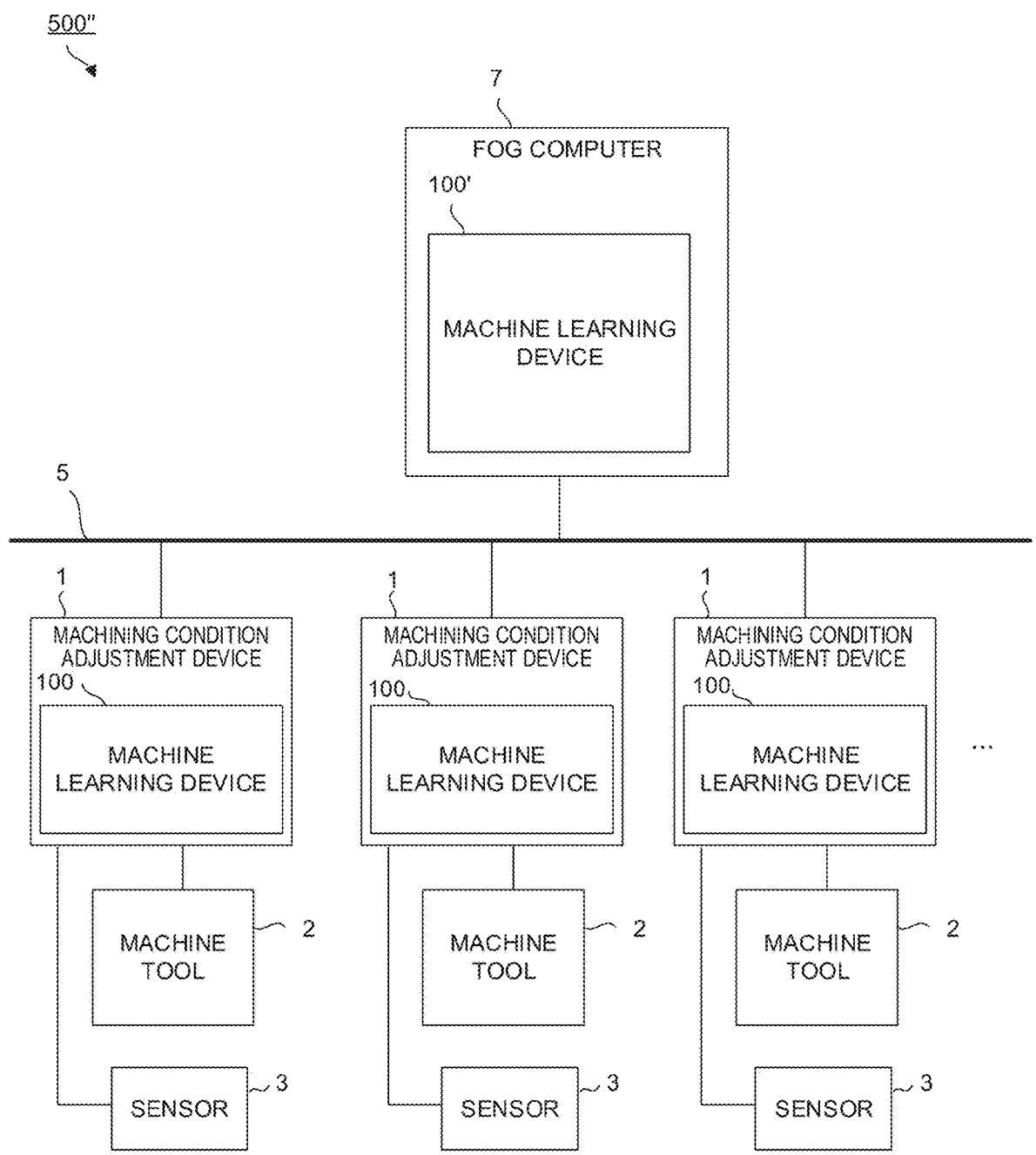

MACHINING CONDITION ADJUSTMENT DEVICE AND MACHINING CONDITION ADJUSTMENT SYSTEM

RELATED APPLICATIONS

The present application claims priority to Japanese Patent Application Number 2019-035779 filed on Feb. 28, 2019, the disclosure of which is hereby incorporated by reference herein in its entirety.

BACKGROUND OF THE INVENTION

1. Field of the Invention

The present invention relates to a machining condition adjustment device and a machining condition adjustment system.

2. Description of the Related Art

There is a prior art technique in which optimization of molding conditions in an injection molding machine is carried out through machine learning (Japanese Patent Application Laid-Open No. 2017-030152 or the like, for instance). When a mold for a new molded product is produced, injection molding machines are demanded that molding conditions optimal for the mold should be set up. The prior art technique disclosed in Japanese Patent Application Laid-Open No. 2017-030152 or the like, can adjust molding conditions optimal for each mold by using a machine learning device.

When a machining center that carries out cutting, machines a workpiece, the machining center carries out a plurality of types of machining such as roughing, drilling, tapping, and finishing. In such a machine tool, particulars demanded for each of the types of machining are different. High cycle time and high machining efficiency are generally demanded in the roughing, and some slight error is permitted. In the finishing, a shape precision is demanded even if the cycle time is longer.

In the machining by machine tools, the particulars demanded for each of the types of the machining are thus different. Additionally, how to carry out the optimization may differ depending on operators. Furthermore, optimal settings differ depending on such factors as installation environment of the machine tool that is used for the machining.

SUMMARY OF THE INVENTION

Therefore, there are demands for a machining condition adjustment device and a machining condition adjustment system that adjust at least either of machining conditions and machining parameters in consideration of particulars demanded in accordance with a machining type of a workpiece in a machine tool.

An aspect of the invention is a machining condition adjustment device that adjusts at least either of a machining condition and a machining parameter for a machine tool to machine a workpiece. The machining condition adjustment device includes: a data acquisition unit that acquires at least one piece of data indicating a state of machining including a machining type in the machine tool; a priority condition storage unit that stores priority condition data in which the machining type in the machine tool is associated with a priority condition for the machining type; a preprocessing unit that produces data to be used for machine learning, based on the data acquired by the data acquisition unit and the priority condition corresponding to the machining type included in the data and stored in the priority condition storage unit; and a machine learning device that carries out processing of the machine learning related to at least either of the machining condition and the machining parameter for machining by the machine tool in an environment where the workpiece is machined by the machine tool, based on the data produced by the preprocessing unit. The machine learning device includes: a learning model storage unit that stores a plurality of learning models generated for each machining type in the machine tool; and a learning model selection unit that selects a learning model to be used for the processing of the machine learning from among the plurality of learning models stored in the learning model storage unit, based on the machine type included in the data produced by the preprocessing unit.

Another aspect of the invention is a machining condition adjustment system including a plurality of devices connected mutually through a network, the plurality of devices including a machining condition adjustment device including at least a learning unit.

According to one aspect of the invention, the machining condition may be adjusted in accordance with a machining type for a workpiece in the machine tool and in consideration of particulars demanded for each machining type.

BRIEF DESCRIPTION OF THE DRAWINGS

The above-mentioned and other objects and features of the invention will become apparent from the following description of embodiments with reference to the accompanying drawings, in which:

FIG. 3 is a diagram for description of priority condition data;

FIG. 12 is a schematic configuration diagram of a machining condition adjustment system according to an eighth embodiment.

DETAILED DESCRIPTION OF THE PREFERRED EMBODIMENTS

Hereinbelow, embodiments of the present invention will be described in conjunction with the drawings.

Figure 1:
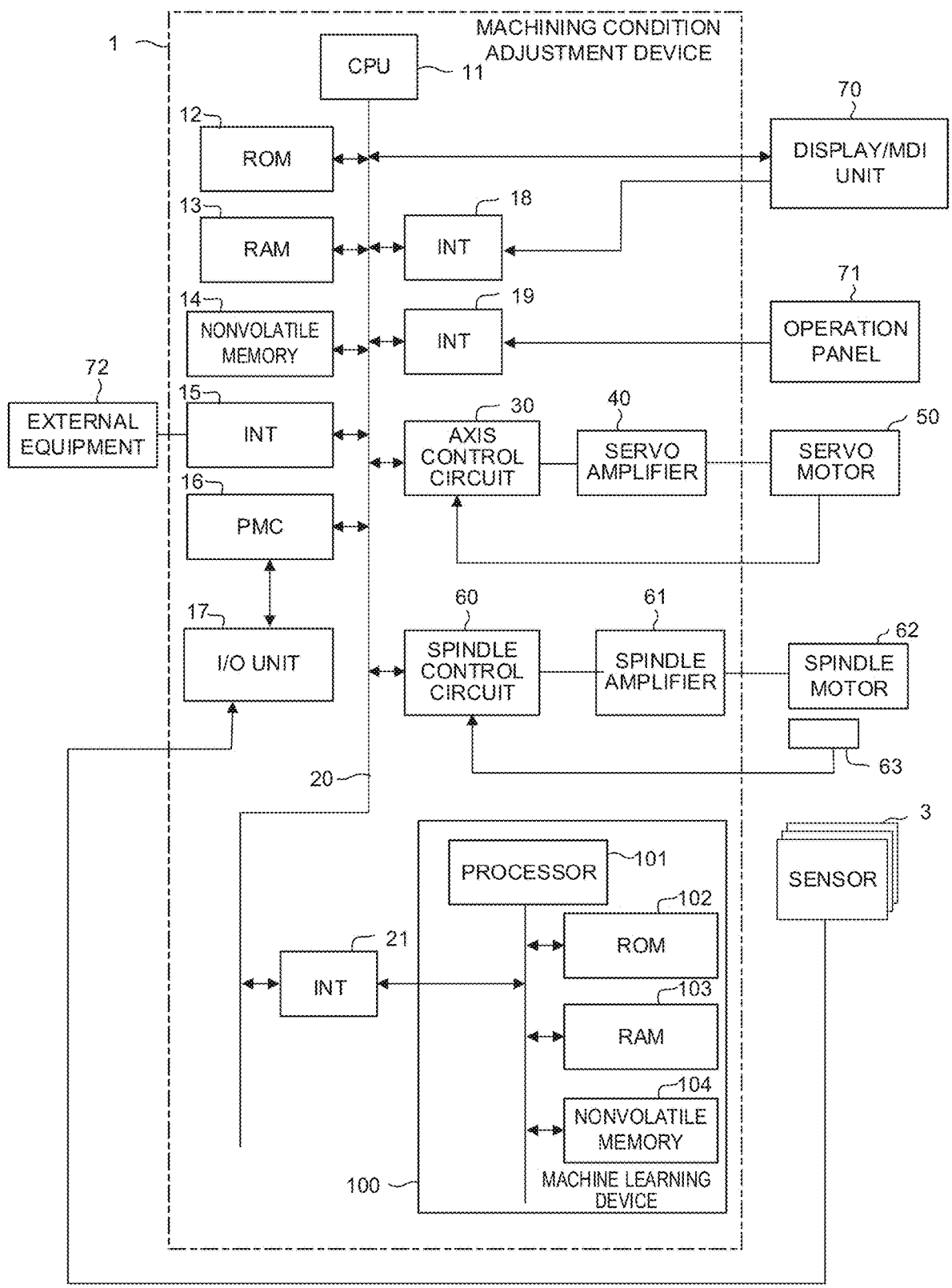
FIG. 1 is a schematic hardware configuration diagram of a machining condition adjustment device according to an embodiment.

FIG. 1 is a schematic hardware configuration diagram illustrating major portions of a machining condition adjustment device including a machine learning device according to an embodiment. A machining condition adjustment device 1 of the embodiment may be implemented on a control device that controls a machine tool, for instance. The machining condition adjustment device 1 of the embodiment may be implemented as a personal computer provided in conjunction with a control device that controls a machine tool or a computer, such as a management device, an edge computer, a fog computer, or a cloud server, connected through a wired/wireless network to the control device. As the embodiment, an example in which the machining condition adjustment device 1 is implemented on a control device that controls a machine tool is presented.

A CPU (Central Processing Unit) 11 included by the machining condition adjustment device 1 according to the embodiment is a processor that generally controls the machining condition adjustment device 1. The CPU 11 reads out system programs stored in a ROM (Read Only Memory) 12 through a bus 20 and controls the whole machining condition adjustment device 1 in accordance with the system programs. Temporary calculation data, displayed data, various types of data inputted by an operator through an input unit (not illustrated), or the like is temporarily stored in a RAM (Random Access Memory) 13.

A nonvolatile memory 14 is configured as a memory whose storage status is retained through backup by a battery (not illustrated) or the like, for instance, even when the machining condition adjustment device 1 is powered off. Programs read from external equipment 72 through an interface 15 or programs inputted through a display/MDI unit 70 have been stored in the nonvolatile memory 14. In the nonvolatile memory 14, various types of data (information on tools such as types of the tools, information on cutting conditions such as spindle speed, feed speed, and cutting depth, information on workpieces such as materials and shapes of the workpieces, power to be consumed by each motor, dimension values and surface quality of portions of machined workpieces and temperatures of portions of the machine tool that have been measured by sensors 3, or the like, for instance) that have been acquired from units of the machining condition adjustment device 1, the machine tool, the sensors 3, and the like have been stored. The programs or the various types of data that are stored in the nonvolatile memory 14 may be loaded in the RAM 13 at time of execution of the programs or use of the data. Various system programs (including system programs for controlling interaction with a machine learning device 100 that will be described later) such as publicly known analysis programs have been written in advance into the ROM 12.

The interface 15 connects the machining condition adjustment device 1 and the external equipment 72 such as an adapter. Programs or various parameters are read from the external equipment 72. The programs or the various parameters edited in the machining condition adjustment device 1 may be stored in external storage means through the external equipment 72. A programmable machine controller (PMC) 16 carries out input and output of signals through an I/O unit 17 into and from the machine tool, a robot, and devices such as the sensors 3 installed in the machine tool or the robot, in order to exert control, in accordance with a sequence program stored in the machining condition adjustment device 1.

The machining condition adjustment device 1 is connected to the sensors 3, such as contact/noncontact distance sensor, imaging device, or surface roughness measuring instrument, which are used in machining of a workpiece by the machine tool. The sensors 3 are used for measurement of errors with respect to design data, profile irregularity, or the like in portions of a workpiece machined by the machine tool.

The display/MDI unit 70 is a manual data input device including a display a keyboard, and the like. An interface 18 receives an instruction or data from the keyboard of the display/MDI unit 70 and delivers the instruction or the data to the CPU 11. The interface 19 is connected to an operation panel 71 including a manual pulse generator or the like that is used when axes are manually moved.

Axis control circuits 30 to control the axes of the machine tool receive travel distance instructions for the axes from the CPU 11 and output instructions for the axes to servo amplifiers 40. The servo amplifiers 40 receive the instructions and drive servo motors 50 that move the axes included in the machine tool. The servo motors 50 for the axes house position/speed detectors, feed back position/speed feedback signals from the position/speed detectors to the axis control circuits 30, and exert feedback control over positions/speeds. Though the axis control circuits 30, the servo amplifiers 40, and the servo motors 50 are each illustrated as only one element in the hardware configuration diagram of FIG. 1, a number of the axis control circuits 30, the servo amplifiers 40, and the servo motors 50 that are actually provided is equal to a number of the axes included in the machine tool to be controlled (three for the machine tool including linear three axes, or five for a five-axis machine tool, for instance).

A spindle control circuit 60 receives a spindle rotation instruction for a spindle of the machine tool and outputs a spindle speed signal to a spindle amplifier 61. The spindle amplifier 61 receives the spindle speed signal, rotates a spindle motor 62 for the spindle at a rotation speed based on the instruction, and thereby drives a tool. A position coder 63 is coupled to the spindle motor 62 and outputs return pulses in synchronization with rotation of the spindle. The return pulses are read by the CPU 11.

An interface 21 connects the machining condition adjustment device 1 and the machine learning device 100. The machine learning device 100 includes a processor 101 which controls the whole machine learning device 100, a ROM 102 in which system programs and the like are stored, a RAM 103 for temporary storage in processes related to machine learning, and a nonvolatile memory 104 which is used for storage of a learning model or the like. The machine learning device 100 is capable of observing information (the information on the tools such as the types of the tools, the information on the cutting conditions such as the spindle speed, the feed speed, and the cutting depth, the information on the workpieces such as the materials and the shapes of the workpieces, the power to be consumed by each motor, the dimension values and the surface quality of the portions of the machined workpieces and the temperatures of the portions of the machine tool that have been measured by the sensors 3, or the like, for instance) that may be acquired in the machining condition adjustment device 1, through the interface 21. The machining condition adjustment device 1 receives information outputted from the machine learning device 100 and carries out control over the machine tool, display on the display/MDI unit 70, transmission of information to other devices through a network not illustrated, or the like.

Figure 2:
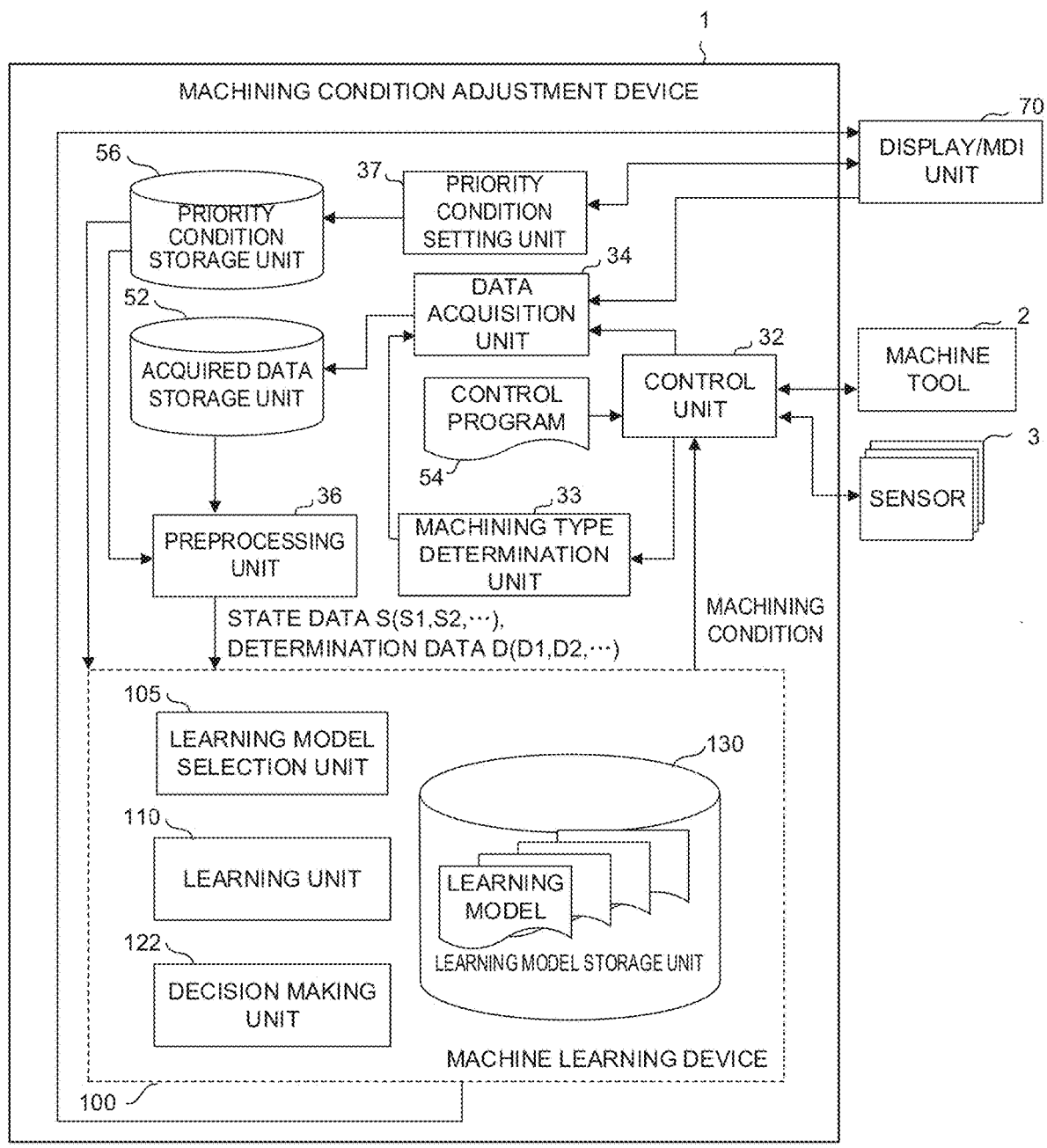
FIG. 2 is a schematic functional block diagram of a machining condition adjustment device according to a first embodiment.

FIG. 2 is a schematic functional block diagram illustrating the machining condition adjustment device 1 and the machine learning device 100 according to a first embodiment. The machining condition adjustment device 1 of the embodiment includes a configuration for learning demanded for the machine learning device 100 that carries out reinforcement learning. Functional blocks illustrated in FIG. 2 are implemented through execution of respective system programs and control over operation of the units of the machining condition adjustment device 1 and the machine learning device 100 by the CPU 11 included by the machining condition adjustment device 1 illustrated in FIG. 1 and the processor 101 of the machine learning device 100.

The machining condition adjustment device 1 of the embodiment includes a control unit 32, a machining type determination unit 33, a data acquisition unit 34, a preprocessing unit 36, and a priority condition setting unit 37 and the machine learning device 100 included by the machining condition adjustment device 1 includes a learning model selection unit 105, a learning unit 110, and a decision making unit 122. On the nonvolatile memory 14 illustrated in FIG. 1, an acquired data storage unit 52 in which data acquired from the machine tool 2, the sensors 3, and the like is stored and a priority condition storage unit 56 in which priority condition data set up by the priority condition setting unit 37 is stored are provided. On the nonvolatile memory 104 of the machine learning device 100 illustrated in FIG. 1, a learning model storage unit 130 that stores a learning model constructed through machine learning by the learning unit 110 is provided.

Control over the machine tool 2 by the control unit 32 is exerted through execution of the system programs, read from the ROM 12, by the CPU 11 included by the machining condition adjustment device 1 illustrated in FIG. 1, arithmetic processing primarily by the CPU 11 with use of the RAM 13 and the nonvolatile memory 14, and control processing for the machine tool 2 and the sensors 3 through the axis control circuits 30, the spindle control circuit 60, and the PMC 16. The control unit 32 controls machining operation by the machine tool 2 and measurement operation by the sensors 3, based on a control program 54 stored in the nonvolatile memory 14 illustrated in FIG. 1. The control unit 32 has functions for general control, demanded for control over the portions of the machine tool 2, such as output of travel instructions at every control cycle to the servo motors 50 (FIG. 1) that move the axes included in the machine tool 2 and to the spindle motor 62 (FIG. 1) based on the control program 54. In addition, the control unit 32 outputs instructions to carry out the measurement operation to the sensors 3. Further, the control unit 32 receives data related to a state and a result of machining by the machine tool 2, from the machine tool 2 and the sensors 3, and outputs the data to the data acquisition unit 34. Examples of the data that are acquired by the control unit 32 from the machine tool 2 and the sensors 3 and that are outputted to the data acquisition unit 34 include the information on the tools such as the types of the tools, the information on the cutting conditions such as the spindle speed, the feed speed, and the cutting depth, the information on machining parameters, the information on the workpieces such as the materials and the shapes of the workpieces, the information such as the power to be consumed by each motor and the temperatures of the portions of the machine tool, the information on results of the machining such as the dimensions and the profile irregularity of the portions of the machined workpieces, and the like, for instance.

When at least either of machining conditions and the machining parameters are outputted from the machine learning device 100, the control unit 32 controls the machining operation in the machine tool 2 with use of the machining conditions or the machining parameters outputted from the machine learning device 100, in place of machining conditions or the machining parameters based on the instructions from the control program 54 or the like.

Determination of a machining type by the machining type determination unit 33 is made through the execution of the system programs read from the ROM 12 by the CPU 11 included by the machining condition adjustment device 1 illustrated in FIG. 1 and the arithmetic processing primarily by the CPU 11 with use of the RAM 13 and the nonvolatile memory 14. The machining type determination unit 33 determines the machining type of the machining that is being carried out in the machine tool 2 in accordance with the instruction from the control unit 32. The machining type determination unit 33 may analyze the control program 54 that is being currently executed in the control unit 32, for instance, and may determine the machining type of the machining being currently carried out based on an instruction that is being currently carried out, an instruction that is executed before or after the instruction, or the like. Then the machining type may be determined based on the type of a tool that is being currently used (tapping in case where a tapping tool is used, drilling in case where a drilling tool is used, or the like), a machining condition (a control code in the instruction, roughing in case where the cutting depth is equal to or greater than a given threshold, finishing in case where the cutting depth is smaller than the threshold, or the like), an annotation in the control program 54, or the like, for instance. Alternatively, the machining type may be determined by preliminary embedding of a code to be used for the determination of the machining type in the control program 54 and reading of the code. Furthermore, the machining type of the machining that is being currently carried out may be determined through preparation of the control program 54 that is different for each machining type or analysis of CAD/CAM data or the like corresponding to the control program 54.

Acquisition of the data by the data acquisition unit 34 is attained through the execution of the system programs read from the ROM 12 by the CPU 11 included by the machining condition adjustment device 1 illustrated in FIG. 1 and the arithmetic processing primarily by the CPU 11 with use of the RAM 13 and the nonvolatile memory 14. The data acquisition unit 34 stores, in the acquired data storage unit 52, the data, related to the state and the result of the machining by the machine tool 2, inputted from the control unit 32, the data related to the result of the machining, inputted by an operator from the display/MDI unit 70, the machining type determined by the machining type determination unit 33, and the like. The data acquisition unit 34 associates the data, related to the state and the result of the machining by the machine tool 2, inputted from the control unit 32, the data related to the result of the machining, inputted by the operator, the machining type determined by the machining type determination unit 33, and the like with one another and stores the associated data as acquired data in the acquired data storage unit 52.

Setting by the priority condition setting unit 37 is attained through the execution of the system programs read from the ROM 12 by the CPU 11 included by the machining condition adjustment device 1 illustrated in FIG. 1, the arithmetic processing primarily by the CPU 11 with use of the RAM 13 and the nonvolatile memory 14, and control processing for the display/MDI unit 70 or the like through the interface 18. The priority condition setting unit 37 receives a priority condition for each machining type in machining of a workpiece and stores the priority condition in the priority condition storage unit 56. The priority condition setting unit 37 displays a UI screen for the setting of the priority condition for each machining type on the display/MDI unit 70, for instance, acquires the priority condition for each machining type that is set up by operation by the operator through the UI screen, produces the priority condition data that is data in which the machining type is associated with the priority condition, and stores the priority condition data in the priority condition storage unit 56.

FIG. 3 illustrates an example of the priority condition data stored in the priority condition storage unit 56. The machining types may be defined as machining processes of carrying out machining with given purposes, such as roughing, finishing, and profile machining, for instance. The priority conditions may be definable with use of demanded particulars for the machining such as "high cycle time" (shortening in machining time cycle time), "energy saving" (reduction in power consumption, consumption of cutting fluid, air consumption, or consumption of lubricant oil, or the like), "high quality machining" (improvement in surface quality, lessening of striated patterns, or the like), "machining accuracy" (improvement in machining accuracy), "extension of lives of components of machine tool" (wear reduction in components such as a feed shaft and bearings, reduction of excessive load, or the like), "extension of tool lives" (reduction of wear and breakage of tools, reduction of excessive stress loading, or the like), "extension of lives of peripheral devices" (setting of minimal speed, operation frequency, or number of times of operation, or the like), "reduction in maximum peak power for machine tool", "increase in yield rate of machined products", "optimization of shape and size of chips", "reduction of vibrations, noise, electromagnetic noise, and heat generated from machine tool and peripherals", or "reduction in heat generation in machine tool", for instance. In such a configuration, a conditional expression that defines a specific machining condition or a specific condition for a machining parameter, measured data, the data related to the result of machining, or the like may be defined in advance for each of the demanded particulars and may be stored in the priority condition storage unit 56 so that the conditional expression may be referred to when a determination concerning each of the demanded particulars is made. A conditional expression, such as "pitch error<$Err_{pit}$", for a machining condition, a machining parameter, measured data, the data related to the result of machining, or the like may be directly defined as a priority condition.

The priority condition data may be data in which a plurality of priority conditions are associated with one machining type. Alternatively, the priority condition data may be data in which priorities are assigned to a plurality of priority conditions. In the example of FIG. 3, for instance, two priority conditions "shape precision" and "cycle time" are associated with the machining type "finishing" and priority of the condition "shape precision" to the condition "cycle time" is specified. The priorities among the priority conditions may be defined by weights or the like and specification of the weights by numerical values or specification of the weights with use of a graph or the like may be enabled. In addition to setting the priority conditions through the display/MDI unit 70, the priority condition setting unit 37 may be made capable of defining the priority condition for each machining type in the control program 54 and setting the priority condition for each machining type that is read from the control program 54. The priority condition setting unit 37 may be made capable of setting the priority condition for each machining type by acquiring the priority condition from another device or the like that is connected through a network (not illustrated).

Preprocessing by the preprocessing unit 36 is carried out through the execution of the system programs read from the ROM 12 by the CPU 11 included by the machining condition adjustment device 1 illustrated in FIG. 1 and the arithmetic processing primarily by the CPU 11 with use of the RAM 13 and the nonvolatile memory 14. The preprocessing unit 36 produces learning data to be used for machine learning by the machine learning device 100, based on the data acquired by the data acquisition unit 34 and the priority condition data stored in the priority condition storage unit 56. The preprocessing unit 36 produces the learning data in which the data acquired by the data acquisition unit 34 (and stored in the acquired data storage unit 52) has undergone conversion (such as digitization or sampling) into a unified format that is handled in the machine learning device 100 and outputs the produced learning data together with the machining type to the machine learning device 100. On condition that the machine learning device 100 carries out the reinforcement learning, for instance, the preprocessing unit 36 produces a set of state data S and determination data D in given formats in the learning, as the learning data.

The state data S that is produced by the preprocessing unit 36 according to the embodiment includes at least tool data S1 including information on tools to be used for machining of workpieces by the machine tool 2 and either of machining condition data S2 including information on the machining conditions in the machining of the workpieces by the machine tool 2 and machining parameter data S3 including parameter information related to the machining of the workpieces by the machine tool 2.

The tool data S1 is defined as data strings indicating types and materials of the tools to be used for the machining of the workpieces by the machine tool 2. The types of the tools may be classified into cutting tool, milling cutter, drilling tool, or the like, for instance, in accordance with shapes of the tools or usage in the machining and may be expressed as numerical values that each have a unique identification. The materials of the tools, such as high speed steel and cemented carbide, may be expressed as numerical values that each have a unique identification. The tool data S1 may be produced through acquisition of the information on the tools set for the machining condition adjustment device 1 and the machine tool 2 by an operator and on the basis of the acquired information on the tools.

The machining condition data S2 is defined as data strings including the machining conditions such as the spindle speed, the feed speed, and the cutting depth based on the settings or the instructions for the machining of the workpieces by the machine tool 2, as elements. As the spindle speed, the feed speed, the cutting depth, and the like, numerical values in which values of the respective machining conditions are expressed with use of given units may be used. The values of the respective machining conditions are set by instructions from the control program 54 or as default values for control and thus may be produced through acquisition of the instructions or the default values.

The machining parameter data S3 is defined as data strings including control parameters for the machine that are referred to for the machining of the workpieces by the machine tool 2, as elements. The control parameters are parameters such as control time constants of motors for control over the machine tool 2, parameters related to control over the peripherals or the like, and so forth. As the machining parameter data S3, the parameters set during the machining may be acquired.

As the determination data D that is produced by the preprocessing unit 36 according to the embodiment, data acquired from the machine tool 2 and the sensors 3 and related to the priority condition associated with the machining type of a state of machining in which the above-mentioned state data S is acquired may be used. On condition that the priority condition data illustrated as the example in FIG. 3 is stored in the priority condition storage unit 56 and that the state data S is produced based on the data acquired from the machine tool 2 (and the sensors 3) during the drilling, for instance, the preprocessing unit 36 produces the determination data D corresponding to the state data S, based on data related to the pitch error. On condition that the state data S is produced based on data acquired from the machine tool 2 (and the sensors 3) during the profile machining, the preprocessing unit 36 produces the determination data D corresponding to the state data S, based on data for determination of the surface quality or the like measured by the sensors 3.

Selection of the learning model by the learning model selection unit 105 is carried out through the execution of the system programs read from the ROM 102 by the processor 101 included by the machining condition adjustment device 1 illustrated in FIG. 1 and the arithmetic processing primarily by the processor 101 with use of the RAM 103 and the nonvolatile memory 104. The learning model selection unit 105 according to the embodiment selects, from the learning model storage unit 130, a learning model corresponding to the machining type inputted from the preprocessing unit 36 and causes the selected learning model to be used for the learning by the learning unit 110 and decision making by the decision making unit 122. On condition that the learning model corresponding to the machining type inputted from the preprocessing unit 36 is not stored in the learning model storage unit 130, the learning model selection unit 105 may newly generates an initialized learning model corresponding to the machining type and may store the learning model in the learning model storage unit 130.

The learning by the learning unit 110 is carried out through the execution of the system programs read from the ROM 102 by the processor 101 included by the machining condition adjustment device 1 illustrated in FIG. 1 and the arithmetic processing primarily by the processor 101 with use of the RAM 103 and the nonvolatile memory 104. The learning unit 110 according to the embodiment carries out the machine learning with use of the learning data produced by the preprocessing unit 36. The learning unit 110 updates the learning model selected by the learning model selection unit 105 so as to learn adjustment behavior for at least either of the machining conditions and the machining parameters with respect to the state and the result of the machining by the machine tool 2, in accordance with a publicly known reinforcement learning technique and stores the updated learning model in the learning model storage unit 130. The reinforcement learning is the technique in which a cycle including observing a current state (that is, input) of an environment where a learning object exists, executing given behavior (that is, output) in the current state, and conferring some reward for the behavior is iterated by a trial-and-error method and in which a measure (the adjustment behavior for at least either of the machining conditions and the machining parameters in the machine learning device 100 of the application) that maximizes total of such rewards is learned as an optimal solution. As the technique of the reinforcement learning that is carried out by the learning unit 110, Q-learning and the like may be enumerated.

In the Q-learning by the learning unit 110, the reward R may be determined based on the priority condition associated with the machining type stored in the priority condition storage unit 56. On condition that the priority condition data illustrated as the example in FIG. 3 is stored in the priority condition storage unit 56 and that the state data S which is the current learning object is based on the data acquired during the drilling, for instance, the reward R may be positive (plus) when the pitch error as the determination data is smaller than the threshold $\text{Err}_{pit}$ stored in the priority condition storage unit 56 or may be negative (minus) when the pitch error is equal to or greater than the threshold $\text{Err}_{pit}$. In case where the data used as the determination data may be handled as data indicating given degree, the reward R may be made positive (plus) and higher or negative (minus) and lower in accordance with the degree. In the above-mentioned example of the pitch error, magnitude of the positive or negative reward may be changed in accordance with a deviation of the pitch error from the threshold $\text{Err}_{pit}$.

On condition that a plurality of priority conditions associated with a machining type are set in the priority condition storage unit 56, the reward R may be calculated with use of an expression in which the plurality of priority conditions are combined. In case where the priority condition data illustrated as the example in FIG. 3 is stored in the priority condition storage unit 56 and where the state data S which is the current learning object is based on the data acquired during the finishing, for instance, a given formula for reward calculation in which data related to the shape precision and data related to the cycle time are used may be defined in advance and the reward R may be calculated with use of the formula for reward calculation. On condition that priorities are set among the priority conditions in this case, dominant data for the calculation of the reward may be changed in accordance with the priorities. When the profile machining is being carried out in the example of FIG. 3, for instance, the formula for reward calculation may be defined as $R = b_1 \times f(x)$ ("x" is data related to shape precision)$+b_2 \times g(y)$ (y is data related to cycle time) or the like (where f(x) and g(y) are given functions for reward calculation) and coefficients $b_1$ and $b_2$ may be adjusted with use of a given reference so as to attain $b_1 > b_2$.

The learning unit 110 may use a neural network as a value function Q (learning model) and may be configured so as to use the state data S and behavior a as input of the neural network and so as to output a value (result y) of the behavior a in a pertinent state. In such a configuration, the neural network having three layers made of an input layer, an interlayer, and an output layer may be used as the learning model. The learning model may be configured so as to carry out more effective learning and inferencing by using a so-called deep learning technique with use of a neural network that forms three or more layers. The learning model updated by the learning unit 110 is stored in the learning model storage unit 130 provided on the nonvolatile memory 104 and is used for determination of the adjustment behavior for at least either of the machining conditions and the machining parameters by the decision making unit 122.

The learning unit 110 is an essential configuration during a stage of learning but is not necessarily the essential configuration after the learning of the adjustment behavior for at least either of the machining conditions and the machining parameters by the learning unit 110 is completed. In case where the machine learning device 100 having completed the learning is shipped to a customer, for instance, the machine learning device 100 from which the learning unit 110 has been removed may be shipped.

The decision making by the decision making unit 122 is carried out through the execution of the system programs read from the ROM 102 by the processor 101 included by the machining condition adjustment device 1 illustrated in FIG. 1 and the arithmetic processing primarily by the processor 101 with use of the RAM 103 and the nonvolatile memory 104. The decision making unit 122 determines the optimal solution of the adjustment behavior for at least either of the machining conditions and the machining parameters with use of the learning model selected by the learning model selection unit 105 based on the state data S inputted from the preprocessing unit 36 and outputs the determined adjustment behavior for at least either of the machining conditions and the machining parameters. The decision making unit 122 of the embodiment inputs the state data S (the tool data S1, the machining condition data S2, and the machining parameter data S3) inputted from the preprocessing unit 36 and the adjustment behavior for at least either of the machining conditions and the machining parameters (a combination of adjustment for the feed speed, adjustment for the spindle speed, and the like, or change in setting of the parameters) as input data into the learned model updated (having the parameters determined) through the reinforcement learning by the learning unit 110, so that the reward in case where the pertinent behavior is executed in the current state is calculated. The calculation of the reward in the decision making unit 122 is carried out for the adjustment behavior for at least either of the machining conditions and the machining parameters that may be currently adopted. Through a comparison among a plurality of calculated rewards, the adjustment behavior for at least either of the machining conditions and the machining parameters that results in calculation of the largest reward is determined as the optimal solution. The optimal solution of the adjustment behavior for at least either of the machining conditions and the machining parameters determined by decision making unit 122 is inputted into the control unit 32 and is used for determination of at least either of the machining conditions and the machining parameters in actual machining. The optimal solution of the adjustment behavior may be additionally used by being displayed as output on the display/MDI unit 70 or by being transmitted as output through a wired/wireless network (not illustrated) to a fog computer, a cloud computer, or the like, for instance.

The machining condition adjustment device 1 can adjust appropriately for at least either of the machining conditions and the machining parameters in accordance with particulars demanded by an operator during the machining of a workpiece by the machine tool 2.

In a modification of the machining condition adjustment device 1 according to the embodiment, the preprocessing unit 36 may further produce workpiece data S4 indicating information on workpieces to be machined by the machine tool 2, as the state data, in addition to the tool data S1, the machining condition data S2, and the machining parameter data S3. The workpiece data S4 is defined as data strings indicating materials of the workpieces to be machined by the machine tool 2. The materials of the workpieces, such as aluminum and iron, may be expressed as numerical values that each have a unique identification. The workpiece data S4 may be produced based on the information on the workpieces set for the machining condition adjustment device 1 or the machine tool 2 by the operator, or the like.

Figure 4:
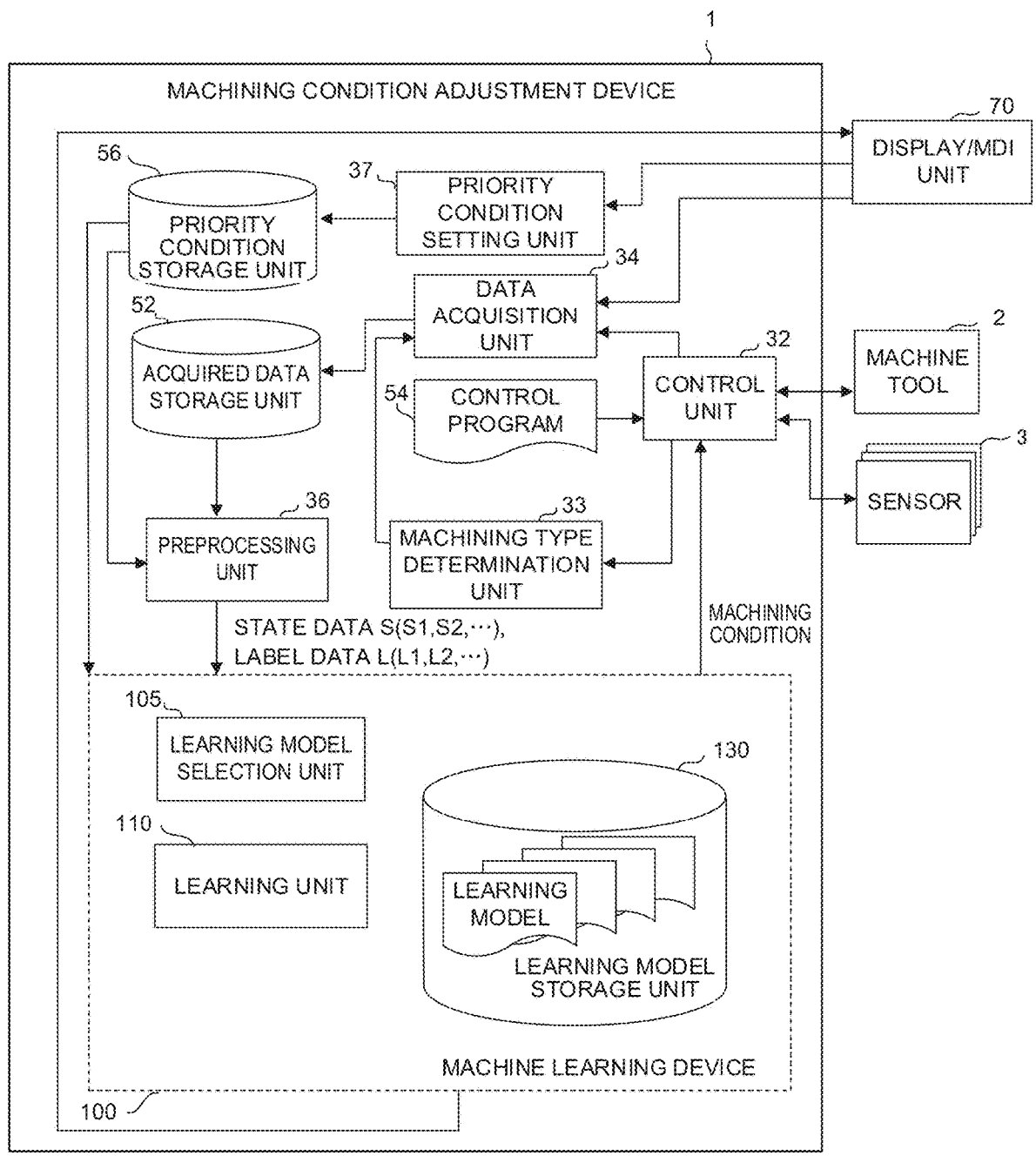
FIG. 4 is a schematic functional block diagram of a machining condition adjustment device according to a second embodiment.

FIG. 4 is a schematic functional block diagram illustrating the machining condition adjustment device 1 and the machine learning device 100 according to a second embodiment. The machining condition adjustment device 1 of the embodiment includes a configuration for learning demanded for the machine learning device 100 that carries out supervised learning. Functions of functional blocks illustrated in FIG. 4 are performed through the execution of the respective system programs and the control over the operation of the units of the machining condition adjustment device 1 and the machine learning device 100 by the CPU 11 included by the machining condition adjustment device 1 illustrated in FIG. 1 and the processor 101 of the machine learning device 100.

The machining condition adjustment device 1 of the embodiment includes the control unit 32, the machining type determination unit 33, the data acquisition unit 34, the preprocessing unit 36, and the priority condition setting unit 37 and the machine learning device 100 included by the machining condition adjustment device 1 includes the learning model selection unit 105 and the learning unit 110. On the nonvolatile memory 14 illustrated in FIG. 1, the acquired data storage unit 52 in which data acquired from the machine tool 2, the sensors 3, and the like is stored and the priority condition storage unit 56 in which priority condition data set up by the priority condition setting unit 37 is stored are provided. The nonvolatile memory 104 of the machine learning device 100 illustrated in FIG. 1, provides the learning model storage unit 130 that stores a learning model constructed through machine learning by the learning unit 110.

The control unit 32, the machining type determination unit 33, the data acquisition unit 34, the priority condition setting unit 37, and the learning model selection unit 105 according to the second embodiment have functions similar to functions of the control unit 32, the machining type determination unit 33, the data acquisition unit 34, the priority condition setting unit 37, and the learning model selection unit 105 according to the first embodiment.

The preprocessing unit 36 according to the embodiment produces learning data to be used for machine learning by the machine learning device 100, based on the data acquired by the data acquisition unit 34 and the priority condition data stored in the priority condition storage unit 56. The preprocessing unit 36 produces the learning data in which the data acquired by the data acquisition unit 34 (and stored in the acquired data storage unit 52) has undergone conversion (such as digitization or sampling) into a unified format that is handled in the machine learning device 100 and outputs the produced learning data together with the machining type to the machine learning device 100. On condition that the machine learning device 100 carries out the supervised learning, for instance, the preprocessing unit 36 produces a set of state data S and label data L in given formats in the learning, as the learning data.

The preprocessing unit 36 according to the embodiment produces the set of the state data S and the label data L, as the learning data, from only the acquired data satisfying a priority condition associated with the machining type in a state in which each acquired data is acquired, among the data acquired by the data acquisition unit 34 (and stored in the acquired data storage unit 52). As for the data acquired during the drilling, on condition that the priority condition data illustrated as the example in FIG. 3 is stored in the priority condition storage unit 56, for instance, the set of the state data S and the label data L is produced as the learning data from only the data in which the pitch error is smaller than the threshold $\text{Err}_{pit}$ and is outputted to the machine learning device 100. It is only the learning data produced based on the data acquired with satisfaction of the priority condition for each machining type that the preprocessing unit 36 outputs to the machine learning device 100. Therefore, the learning model having undergone the learning with use of this learning data outputs at least either of the machining conditions and the machining parameters for such machining as to satisfy the priority condition.

The state data S that is produced by the preprocessing unit 36 according to the embodiment includes at least the tool data S1 including information on tools to be used for machining of workpieces by the machine tool 2. The tool data S1 is defined as data strings indicating types and materials of the tools to be used for the machining of the workpieces by the machine tool 2. The types of the tools may be classified into cutting tool, milling cutter, drilling tool, or the like, for instance, in accordance with shapes of the tools or usage in the machining and may be expressed as numerical values that each have a unique identification. The materials of the tools, such as high speed steel and cemented carbide, may be expressed as numerical values that each have a unique identification. The tool data S1 may be produced through acquisition of the information on the tools set for the machining condition adjustment device 1 and the machine tool 2 by an operator and on the basis of the acquired information on the tools.

The label data L that is produced by the preprocessing unit 36 according to the embodiment includes at least either of machining condition label data L1 labeled with information on the machining conditions in the machining of a workpiece by the machine tool 2 in the state of machining in which the state data S is acquired or machining parameter label data L2 including parameter information related to the machining of the workpiece by the machine tool 2.

The machining condition label data L1 is defined as data strings including the machining conditions such as the spindle speed, the feed speed, and the cutting depth based on the settings or the instructions for the machining of the workpieces by the machine tool 2, as elements. As the spindle speed, the feed speed, the cutting depth, and the like, numerical values in which values of the respective machining conditions are expressed with use of given units may be used. The values of the respective machining conditions are set by instructions from the control program 54 or as default values for control and thus may be produced through acquisition of the instructions or the default values.

The machining parameter label data L2 is defined as data strings including control parameters for the machine that are referred to for the machining of the workpieces by the machine tool 2, as elements. The control parameters are parameters such as control time constants of motors for control over the machine tool 2, parameters related to control over the peripherals or the like, and so forth. As the machining parameter label data L2, the parameters set during the machining may be acquired.

The learning by the learning unit 110 according to the embodiment is carried out through the execution of the system programs read from the ROM 102 by the processor 101 included by the machining condition adjustment device 1 illustrated in FIG. 1 and the arithmetic processing primarily by the processor 101 with use of the RAM 103 and the nonvolatile memory 104. The learning unit 110 according to the embodiment carries out the machine learning with use of the learning data produced by the preprocessing unit 36. The learning unit 110 updates the learning model selected by the learning model selection unit 105 so as to learn at least either of the machining conditions and the machining parameters satisfying the priority condition with respect to the state of machining by the machine tool 2, in accordance with a publicly known supervised learning technique and stores the updated learning model in the learning model storage unit 130. As the supervised learning technique that is carried out by the learning unit 110, multilayer perceptron technique, recurrent neural network technique, long short-term memory technique, convolutional neural network technique, and the like may be enumerated.

The learning unit 110 according to the embodiment updates the learning model so as to learn at least either of the machining conditions and the machining parameters satisfying the priority condition corresponding to the machining type, in association with the state of machining by the machine tool 2. The learning model generated by the learning unit 110 according to the embodiment in this manner may be used for estimation of at least either of the machining conditions and the machining parameters satisfying the priority condition corresponding to the machining type, when the state of machining by the machine tool 2 is given.

The learning unit 110 is an essential configuration during the stage of learning but is not necessarily the essential configuration after the learning of at least either of the machining conditions and the machining parameters satisfying the priority condition corresponding to the machining type by the learning unit 110 is completed. In case where the machine learning device 100 having completed the learning is shipped to a customer, for instance, the machine learning device 100 from which the learning unit 110 has been removed may be shipped.

The machining condition adjustment device 1 having the above-mentioned configuration according to the embodiment generates a plurality of learning models in which at least either of the machining conditions and the machining parameters satisfying the priority condition corresponding to each machining type and the state of machining by the machine tool 2 have been learned in association. With use of the plurality of learning models generated in this manner, an estimation unit 120 that will be described later is capable of carrying out estimation processing that is based on the state data S acquired from the machine tool 2 and that is demanded for determination of at least either of the machining conditions and the machining parameters which are more appropriate and which correspond to the machining type in the acquired state.

In a modification of the machining condition adjustment device 1 according to the embodiment, the preprocessing unit 36 may further produce the workpiece data S4 indicating information on workpieces to be machined by the machine tool 2, as the state data, in addition to the tool data S1. The workpiece data S4 is defined as data strings indicating materials of the workpieces to be machined by the machine tool 2. The materials of the workpieces, such as aluminum and iron, may be expressed as numerical values that each have a unique identification. The workpiece data S4 may be produced based on the information on the workpieces set for the machining condition adjustment device 1 or the machine tool 2 by the operator, or the like.

Figure 5:
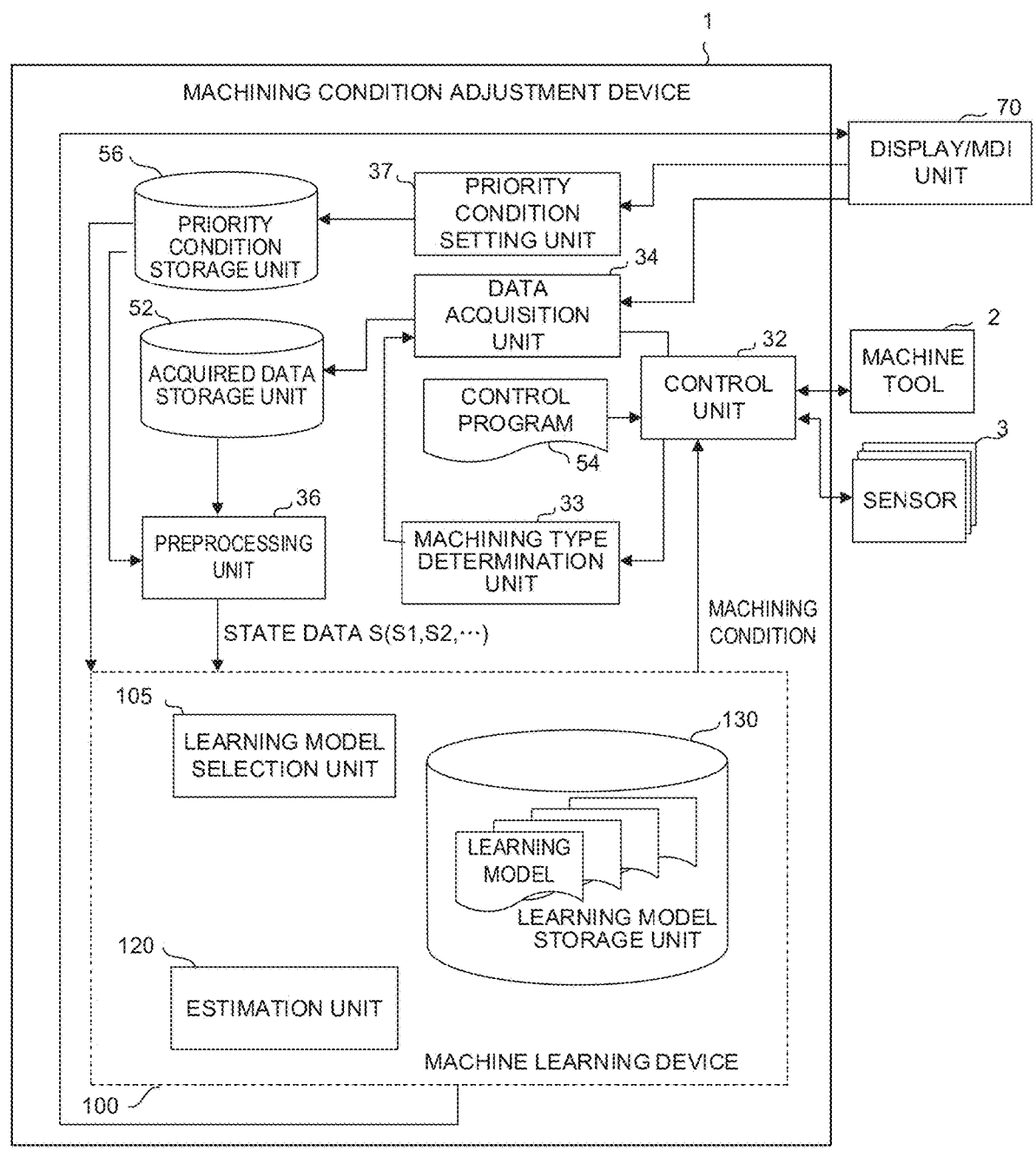
FIG. 5 is a schematic functional block diagram of a machining condition adjustment device according to a third embodiment.

FIG. 5 is a schematic functional block diagram illustrating the machining condition adjustment device 1 and the machine learning device 100 according to a third embodiment. The machining condition adjustment device 1 of the embodiment includes a configuration for estimation that is demanded when the machine learning device 100 estimates at least either of machining conditions and machining parameters for machining by each machine tool. Functional blocks illustrated in FIG. 5 are implemented through the execution of the respective system programs and the control over the operation of the units of the machining condition adjustment device 1 and the machine learning device 100 by the CPU 11 included by the machining condition adjustment device 1 illustrated in FIG. 1 and the processor 101 of the machine learning device 100.

The machining condition adjustment device 1 of the embodiment includes the control unit 32, the machining type determination unit 33, the data acquisition unit 34, the preprocessing unit 36, and the priority condition setting unit 37 and the machine learning device 100 included by the machining condition adjustment device 1 includes the learning model selection unit 105 and an estimation unit 120. On the nonvolatile memory 14 illustrated in FIG. 1, the acquired data storage unit 52 in which data acquired from the machine tool 2, the sensors 3, and the like is stored and the priority condition storage unit 56 in which priority condition data set up by the priority condition setting unit 37 is stored are provided. The nonvolatile memory 104 of the machine learning device 100 illustrated in FIG. 1, provides the learning model storage unit 130 that stores a learning model constructed through machine learning by the learning unit 110 described in the second embodiment.

The control unit 32, the machining type determination unit 33, the data acquisition unit 34, the priority condition setting unit 37, and the learning model selection unit 105 according to the third embodiment have functions similar to functions of the control unit 32, the machining type determination unit 33, the data acquisition unit 34, the priority condition setting unit 37, and the learning model selection unit 105 according to the first embodiment.

In a stage of the estimation of at least either of the machining conditions and the machining parameters satisfying the priority condition with use of the learning model by the machine learning device 100, the preprocessing unit 36 according to the embodiment carries out the conversion (such as digitization or sampling) into the unified format that is handled in the machine learning device 100, based on the data acquired by the data acquisition unit 34 and the priority condition data stored in the priority condition storage unit 56. The state data S in a given format that is used for the estimation by the machine learning device 100 is produced from the converted data and the produced state data S, together with the machining type, is outputted to the machine learning device 100. For instance, the preprocessing unit 36 produces the tool data S1 based on the data acquired by the data acquisition unit 34.

The estimation by the estimation unit 120 is carried out through the execution of the system programs read from the ROM 102 by the processor 101 included by the machining condition adjustment device 1 illustrated in FIG. 1 and the arithmetic processing primarily by the processor 101 with use of the RAM 103 and the nonvolatile memory 104. The estimation unit 120 carries out the estimation of at least either of the machining conditions and the machining parameters satisfying the priority condition with use of the learning model selected by the learning model selection unit 105, based on the state data S produced by the preprocessing unit 36. In the estimation unit 120 of the embodiment, the state data S inputted from the preprocessing unit 36 is inputted into the learning model generated (having the parameters determined) by the learning unit 110 and at least either of the machining conditions and the machining parameters satisfying the priority condition associated with the machining type are thereby estimated and outputted. A result estimated by the estimation unit 120 is outputted to the control unit 32.

The machining condition adjustment device 1 having the above-mentioned configuration according to the embodiment is capable of estimating at least either of the machining conditions and the machining parameters satisfying the priority condition corresponding to each machining type and controlling the machining operation for a workpiece by the machine tool 2 based on at least either of the machining conditions and the machining parameters that have been estimated.

In a modification of the machining condition adjustment device 1 according to the embodiment, the preprocessing unit 36 may further produce the workpiece data S4 indicating information on workpieces to be machined by the machine tool 2, as the state data, in addition to the tool data S1. The workpiece data S4 is defined as data strings indicating materials of the workpieces to be machined by the machine tool 2. The materials of the workpieces, such as aluminum and iron, may be expressed as numerical values that each have a unique identification. The workpiece data S4 may be produced based on the information on the workpieces set for the machining condition adjustment device 1 or the machine tool 2 by the operator, or the like.

Figure 6:
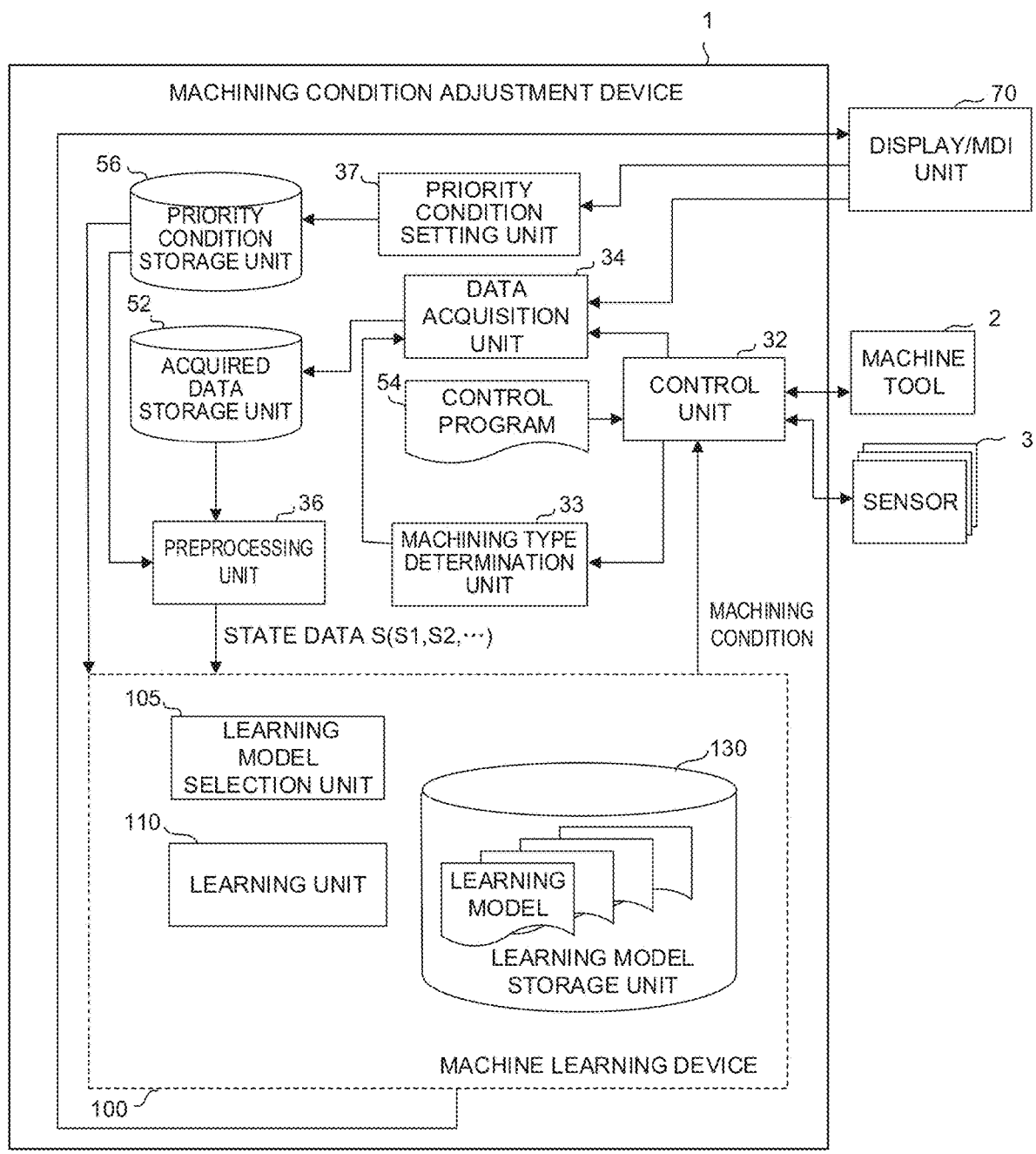
FIG. 6 is a schematic functional block diagram of a machining condition adjustment device according to a fourth embodiment.

FIG. 6 is a schematic functional block diagram illustrating the machining condition adjustment device 1 and the machine learning device 100 according to a fourth embodiment. The machining condition adjustment device 1 of the embodiment includes a configuration for learning demanded for the machine learning device 100 that carries out unsupervised learning. Functional blocks illustrated in FIG. 6 are implemented through execution of respective system programs and control over operation of the units of the machining condition adjustment device 1 and the machine learning device 100 by the CPU 11 included by the machining condition adjustment device 1 illustrated in FIG. 1 and the processor 101 of the machine learning device 100.

The machining condition adjustment device 1 of the embodiment includes the control unit 32, the machining type determination unit 33, the data acquisition unit 34, the preprocessing unit 36, and the priority condition setting unit 37 and the machine learning device 100 included by the machining condition adjustment device 1 includes the learning model selection unit 105 and the learning unit 110. The nonvolatile memory 14 illustrated in FIG. 1, provides the acquired data storage unit 52 in which data acquired from the machine tool 2, the sensors 3, and the like is stored and the priority condition storage unit 56 in which priority condition data set up by the priority condition setting unit 37 is stored. The nonvolatile memory 104 of the machine learning device 100 illustrated in FIG. 1, provides the learning model storage unit 130 that stores a learning model constructed through machine learning by the learning unit 110.

The control unit 32, the machining type determination unit 33, the data acquisition unit 34, the priority condition setting unit 37, and the learning model selection unit 105 according to the fourth embodiment have functions similar to functions of the control unit 32, the machining type determination unit 33, the data acquisition unit 34, the priority condition setting unit 37, and the learning model selection unit 105 according to the first embodiment.

The preprocessing unit 36 according to the embodiment produces learning data to be used for machine learning by the machine learning device 100, based on the data acquired by the data acquisition unit 34 and the priority condition data stored in the priority condition storage unit 56. The preprocessing unit 36 produces the learning data in which the data acquired by the data acquisition unit 34 and stored in the acquired data storage unit 52 has undergone conversion (such as digitization or sampling) into a unified format that is handled in the machine learning device 100 and outputs the produced learning data together with the machining type to the machine learning device 100. On condition that the machine learning device 100 carries out the unsupervised learning, for instance, the preprocessing unit 36 produces state data S in given formats in the learning, as the learning data.

The preprocessing unit 36 according to the embodiment produces the state data S, as the learning data, from only the acquired data satisfying a priority condition associated with the machining type in a state in which each acquired data is acquired, among the data acquired by the data acquisition unit 34 (and stored in the acquired data storage unit 52). As for the data acquired during the drilling, on condition that the priority condition data illustrated as the example in FIG. 3 is stored in the priority condition storage unit 56, for instance, the state data S is produced as the learning data from only the data in which the pitch error is smaller than the threshold $\text{Err}_{pit}$ and is outputted to the machine learning device 100. It is only the learning data produced based on the data acquired with satisfaction of the priority condition for each machining type that the preprocessing unit 36 outputs to the machine learning device 100. Therefore, the learning model having undergone the learning with use of this learning data represents a distribution of at least either of the machining conditions and the machining parameters for such machining as to satisfy the priority condition.

The state data S that is produced by the preprocessing unit 36 according to the embodiment includes at least the tool data S1 including information on tools to be used for machining of workpieces by the machine tool 2 and either of the machining condition data S2 including information on the machining conditions in the machining of the workpieces by the machine tool 2 and the machining parameter data S3 including parameter information related to the machining of the workpieces by the machine tool 2.

The tool data S1 is defined as data strings indicating types and materials of the tools to be used for the machining of the workpieces by the machine tool 2. The types of the tools may be classified into cutting tool, milling cutter, drilling tool, or the like, for instance, in accordance with shapes of the tools or usage in the machining and may be expressed as numerical values that each have a unique identification. The materials of the tools, such as high speed steel and cemented carbide, may be expressed as numerical values that each have a unique identification. The tool data S1 may be produced through acquisition of the information on the tools set for the machining condition adjustment device 1 and the machine tool 2 by an operator and on the basis of the acquired information on the tools.

The machining condition data S2 is defined as data strings including the machining conditions such as the spindle speed, the feed speed, and the cutting depth based on the settings or the instructions for the machining of the workpieces by the machine tool 2, as elements. As the spindle speed, the feed speed, the cutting depth, and the like, numerical values in which values of the respective machining conditions are expressed with use of given units may be used. The values of the respective machining conditions are set by instructions from the control program 54 or as default values for control and thus may be produced through acquisition of the instructions or the default values.

The machining parameter data S3 is defined as data strings including control parameters for the machine that are referred to for the machining of the workpieces by the machine tool 2, as elements. The control parameters are parameters such as control time constants of motors for control over the machine tool 2, parameters related to control over the peripherals or the like, and so forth. As the machining parameter data S3, the parameters set during the machining may be acquired.

The learning by the learning unit 110 according to the embodiment is carried out through the execution of the system programs read from the ROM 102 by the processor 101 included by the machining condition adjustment device 1 illustrated in FIG. 1 and the arithmetic processing primarily by the processor 101 with use of the RAM 103 and the nonvolatile memory 104. The learning unit 110 according to the embodiment carries out the machine learning with use of the learning data produced by the preprocessing unit 36. The learning unit 110 updates the learning model selected by the learning model selection unit 105 so as to learn the distribution of at least either of the machining conditions and the machining parameters satisfying the priority condition in the machining by the machine tool 2, in accordance with a publicly known unsupervised learning technique and stores the updated learning model in the learning model storage unit 130. As the unsupervised learning technique that is carried out by the learning unit 110, autoencoder technique, k-means technique, and the like may be enumerated, for instance.

The learning unit 110 according to the embodiment updates the learning model so as to learn the distribution of at least either of the machining conditions and the machining parameters satisfying the priority condition corresponding to the machining type in the machining by the machine tool 2. The learning model generated by the learning unit 110 according to the embodiment in this manner may be used for estimation of at least either of the machining conditions and the machining parameters satisfying the priorities corresponding to the machining type in the machining by the machine tool 2.

The learning unit 110 is an essential configuration during the stage of the learning but is not necessarily the essential configuration after the learning of the distribution of at least either of the machining conditions and the machining parameters satisfying the priority condition corresponding to the machining type by the learning unit 110 is completed. In case where the machine learning device 100 having completed the learning is shipped to a customer, for instance, the machine learning device 100 from which the learning unit 110 has been removed may be shipped.

The machining condition adjustment device 1 having the above-mentioned configuration according to the embodiment generates a plurality of learning models in which the distribution of at least either of the machining conditions and the machining parameters satisfying the priority condition corresponding to each machining type has been learned. With use of the plurality of learning models generated in this manner, the estimation unit 120 that will be described later is capable of carrying out estimation processing that is based on the state data S acquired from the machine tool 2 and that is demanded for determination of at least either of the machining conditions and the machining parameters which are more appropriate and which correspond to the machining type in the acquired state.

In a modification of the machining condition adjustment device 1 according to the embodiment, the preprocessing unit 36 may further produce the workpiece data S4 indicating information on workpieces to be machined by the machine tool 2, as the state data, in addition to the tool data S1, the machining condition data S2, and the machining parameter data S3. The workpiece data S4 is defined as data strings indicating materials of the workpieces to be machined by the machine tool 2. The materials of the workpieces, such as aluminum and iron, may be expressed as numerical values that each have a unique identification. The workpiece data S4 may be produced based on the information on the workpieces set for the machining condition adjustment device 1 or the machine tool 2 by the operator, or the like.

Figure 7:
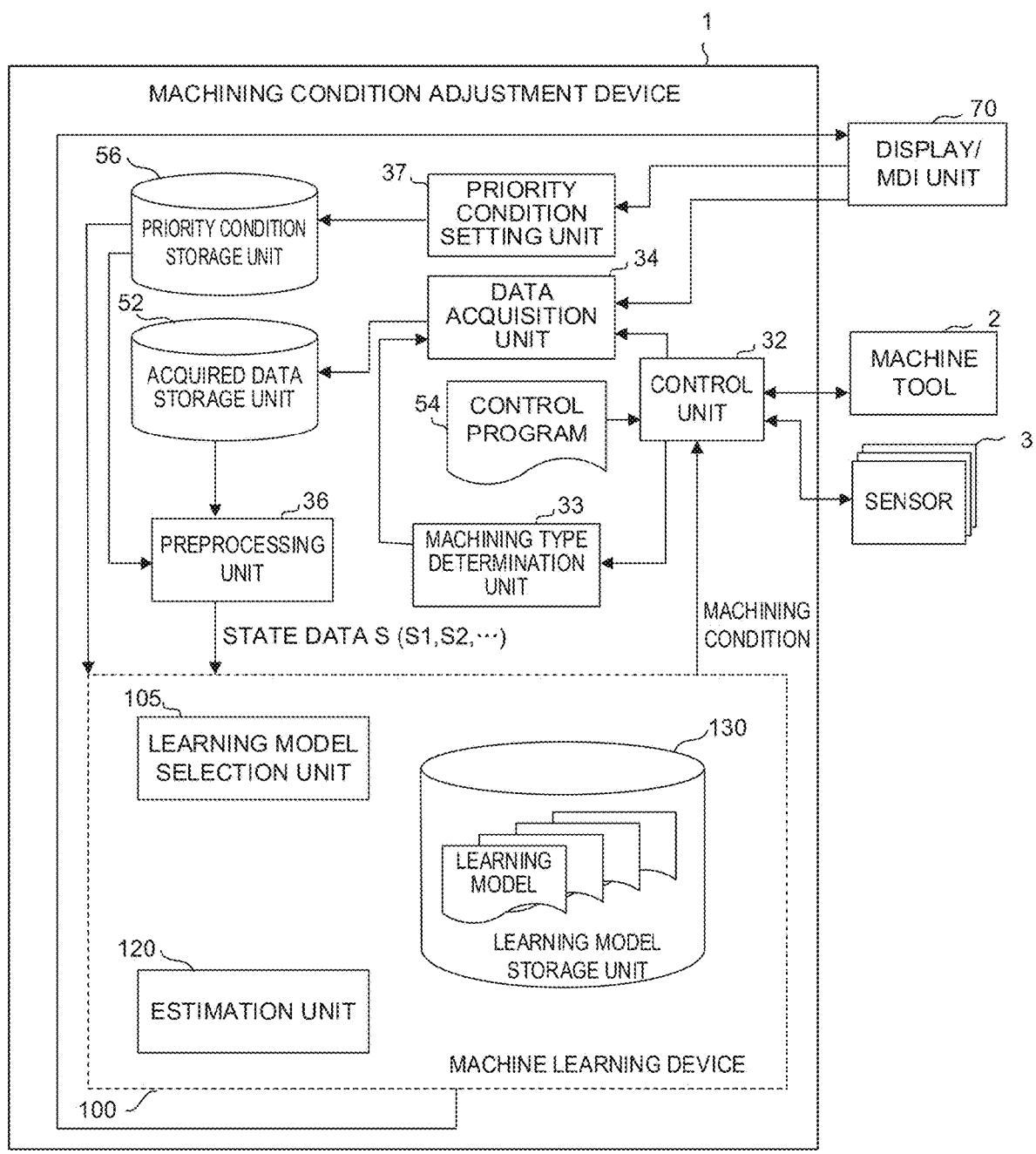
FIG. 7 is a schematic functional block diagram of a machining condition adjustment device according to a fifth embodiment.

FIG. 7 is a schematic functional block diagram illustrating the machining condition adjustment device 1 and the machine learning device 100 according to a fifth embodiment. The machining condition adjustment device 1 of the embodiment includes a configuration that is demanded when the machine learning device 100 estimates at least either of machining conditions and machining parameters for machining by each machine tool. Functions of functional blocks illustrated in FIG. 7 are performed through the execution of the respective system programs and the control over the operation of the units of the machining condition adjustment device 1 and the machine learning device 100 by the CPU 11 included by the machining condition adjustment device 1 illustrated in FIG. 1 and the processor 101 of the machine learning device 100.

The machining condition adjustment device 1 of the embodiment includes the control unit 32, the machining type determination unit 33, the data acquisition unit 34, the preprocessing unit 36, and the priority condition setting unit 37 and the machine learning device 100 included by the machining condition adjustment device 1 includes the learning model selection unit 105 and the estimation unit 120. The nonvolatile memory 14 illustrated in FIG. 1, provides the acquired data storage unit 52 in which data acquired from the machine tool 2, the sensors 3, and the like is stored and the priority condition storage unit 56 in which priority condition data set up by the priority condition setting unit 37 is stored. The nonvolatile memory 104 of the machine learning device 100 illustrated in FIG. 1, provides the learning model storage unit 130 that stores a learning model constructed through machine learning by the learning unit 110 described in the second embodiment.

The control unit 32, the machining type determination unit 33, the data acquisition unit 34, the priority condition setting unit 37, and the learning model selection unit 105 according to the fifth embodiment have functions similar to functions of the control unit 32, the machining type determination unit 33, the data acquisition unit 34, the priority condition setting unit 37, and the learning model selection unit 105 according to the first embodiment.

In a stage of the estimation of at least either of the machining conditions and the machining parameters satisfying the priority condition with use of the learning model by the machine learning device 100, the preprocessing unit 36 according to the embodiment carries out the conversion (such as digitization or sampling) into the unified format that is handled in the machine learning device 100, based on the data acquired by the data acquisition unit 34 and the priority condition data stored in the priority condition storage unit 56. The state data S in a given format that is used for the estimation by the machine learning device 100 is produced from the converted data and the produced state data S, together with the machining type, is outputted to the machine learning device 100. For instance, the preprocessing unit 36 produces at least the tool data S1 and either of the machining condition data S2 and the machining parameter data S3 based on the data acquired by the data acquisition unit 34.

The estimation by the estimation unit 120 is carried out through the execution of the system programs read from the ROM 102 by the processor 101 included by the machining condition adjustment device 1 illustrated in FIG. 1 and the arithmetic processing primarily by the processor 101 with use of the RAM 103 and the nonvolatile memory 104. The estimation unit 120 carries out the estimation of at least either of the machining conditions and the machining parameters satisfying the priority condition with use of the learning model selected by the learning model selection unit 105, based on the state data S produced by the preprocessing unit 36. In the estimation unit 120 of the embodiment, at least either of the machining conditions and the machining parameters satisfying the priority condition are estimated and outputted based on a position of the state data S inputted from the preprocessing unit 36 in a distribution of data included in the learning model generated by the learning unit 110. A result estimated by the estimation unit 120 is outputted to the control unit 32.

The estimation unit 120 calculates a distance between each data set (cluster) in the distribution of the data included in the learning model generated by the learning unit 110 and the position of the state data S inputted from the preprocessing unit 36 and estimates that the current machining conditions or machining parameters satisfy the priority condition in the current machining type, in case where the distance between the position of the state data S inputted from the preprocessing unit 36 and a nearest data set $Cl_n$ is equal to or shorter than a predetermined and given threshold $Dist_{th1}$, for instance. The estimation unit 120 estimates that the priority condition in the current machining type is not satisfied because of at least either of the current machining conditions and machining parameters, in case where the distance between the position of the state data S inputted from the preprocessing unit 36 and the nearest data set $Cl_n$ is longer than the predetermined and given threshold $Dist_{th1}$, for instance. The estimation unit 120 adjusts one machining condition or machining parameter or a plurality of machining conditions or machining parameters within the state data S inputted from the preprocessing unit 36 in accordance with a predetermined and given rule so that the distance to the data set $Cl_n$ may be made equal to or shorter than the predetermined and given threshold $Dist_{th1}$. The predetermined rule for such adjustment may be a rule by which a given machining condition or a given machining parameter is fixedly adjusted, for instance. The rule may provide that the adjustment shall be made so that the distance to the data set $Cl_n$ may be made equal to or shorter than the predetermined and given threshold $Dist_{th1}$ by a smallest adjustment amount. There may be a rule that a given machining condition or a given machining parameter shall be excluded from objects of the adjustment. Thus the estimation unit 120 estimates and outputs at least either of the machining conditions and the machining parameters satisfying the priority condition, based on the current state data S and the learning model.

The estimation unit 120 may output an instruction to stop the machining, in case where the distance between the position of the state data S inputted from the preprocessing unit 36 and the nearest data set $Cl_n$ is longer than a predetermined and given threshold $Dist_{th2}$ (threshold $Dist_{th2}$>threshold $Dist_{th1}$). An instruction for emergency stop may be outputted in case where the distance is longer than a predetermined and given threshold $Dist_{th3}$ (threshold $Dist_{th3}$>threshold $Dist_{th2}$). Such a technique makes it possible to estimate that the state of machining is abnormal, in case where operation vastly different from normal operation is carried out, and to call attention of the operator.

The machining condition adjustment device 1 having the above-mentioned configuration according to the embodiment is capable of estimating at least either of the machining conditions and the machining parameters satisfying the priority condition corresponding to each machining type and controlling the machining operation for a workpiece by the machine tool 2 based on at least either of the machining conditions and the machining parameters that have been estimated.

In a modification of the machining condition adjustment device 1 according to the embodiment, the preprocessing unit 36 may further produce the workpiece data S4 indicating information on workpieces to be machined by the machine tool 2, as the state data, in addition to the tool data S1, the machining condition data S2, and the machining parameter data S3. The workpiece data S4 is defined as data strings indicating materials of the workpieces to be machined by the machine tool 2. The materials of the workpieces, such as aluminum and iron, may be expressed as numerical values that each have a unique identification. The workpiece data S4 may be produced based on the information on the workpieces set for the machining condition adjustment device 1 or the machine tool 2 by the operator, or the like.

Figure 8:
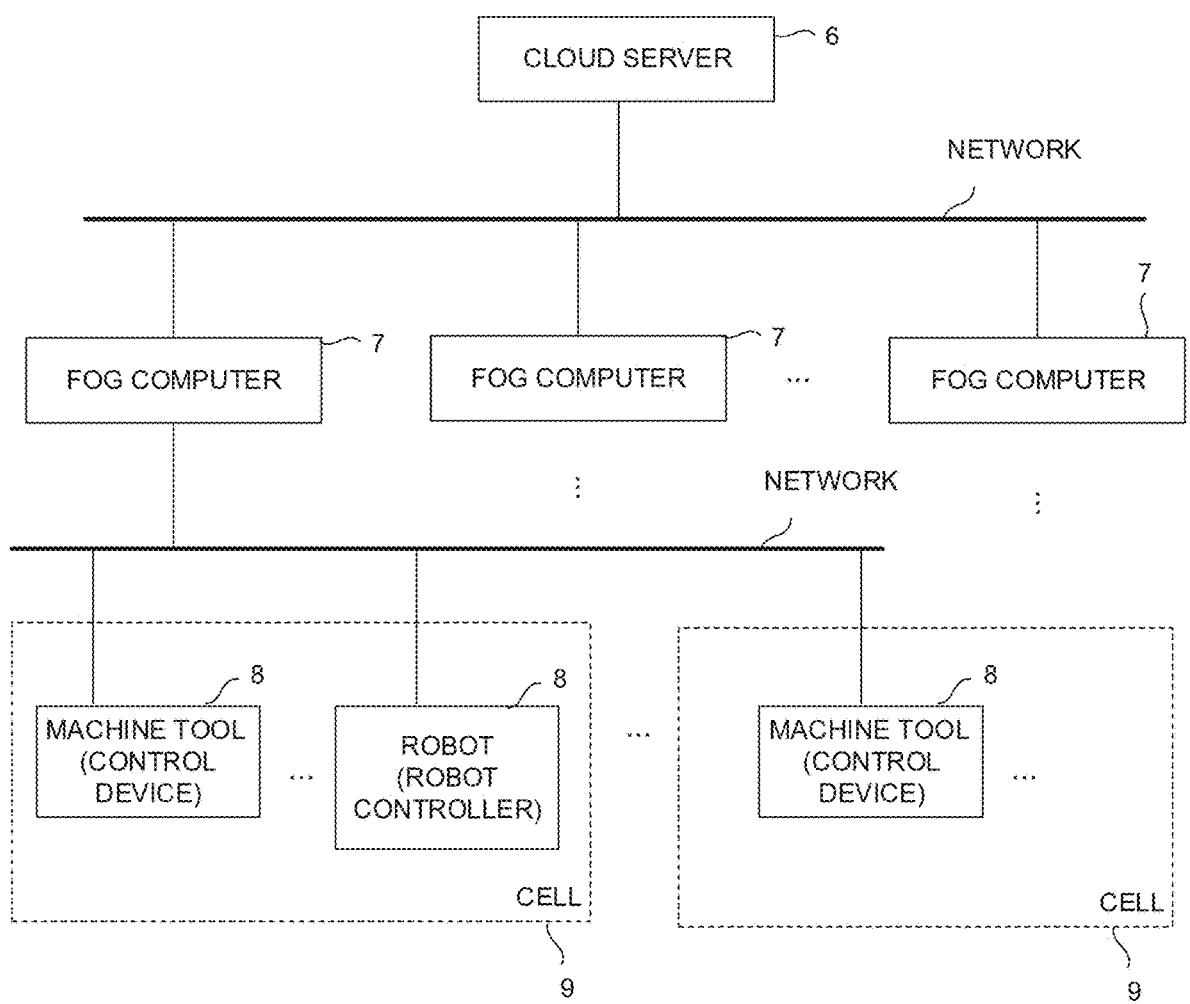
FIG. 8 is a diagram illustrating an example of a system with a three-layer structure including a cloud server, fog computers, and edge computers.

As sixth to eighth embodiments below, embodiments in which the machining condition adjustment devices 1 according to the first to fifth embodiments are implemented as portions of systems each connected through a wired/wireless network to a plurality of devices including a cloud server, a host computer, a fog computer, or an edge computer (robot controller, control device, or the like) will be described. In the sixth to eighth embodiments, as illustrated in FIG. 8 as an example, a system that is configured so as to be logically separated into three layers in a state in which the plurality of devices are each connected to the network is assumed. The three layers are a layer including a cloud server 6 and the like, a layer including fog computers 7 and the like, and a layer including edge computers 8 (a robot controller, control devices, and the like included in cells 9) and the like. In such a system, the machining condition adjustment device 1 according to an aspect of the invention may be implemented on any of the cloud server 6, the fog computers 7, and the edge computers 8. The machining condition adjustment device 1 is capable of carrying out distributed learning with sharing of data to be used in processing related to machine learning with the plurality of devices through the network, large-scale analysis with collection of the generated learning models into the fog computers 7 or the cloud server 6, mutual reuse of the generated learning models, and the like. In the system illustrated in FIG. 8 as the example, a plurality of cells 9 are provided in each of factories existing in various regions and the fog computers 7 of a higher layer separately manage the cells 9 in given units (each unit consisting of a single factory, a plurality of factories belonging to the same manufacturer, or the like). Data collected and analyzed by the fog computers 7 is further collected and analyzed by the cloud server 6 of a still higher layer, so that resultant information may be utilized for control in each of the edge computers 8, or the like.

Figure 9:
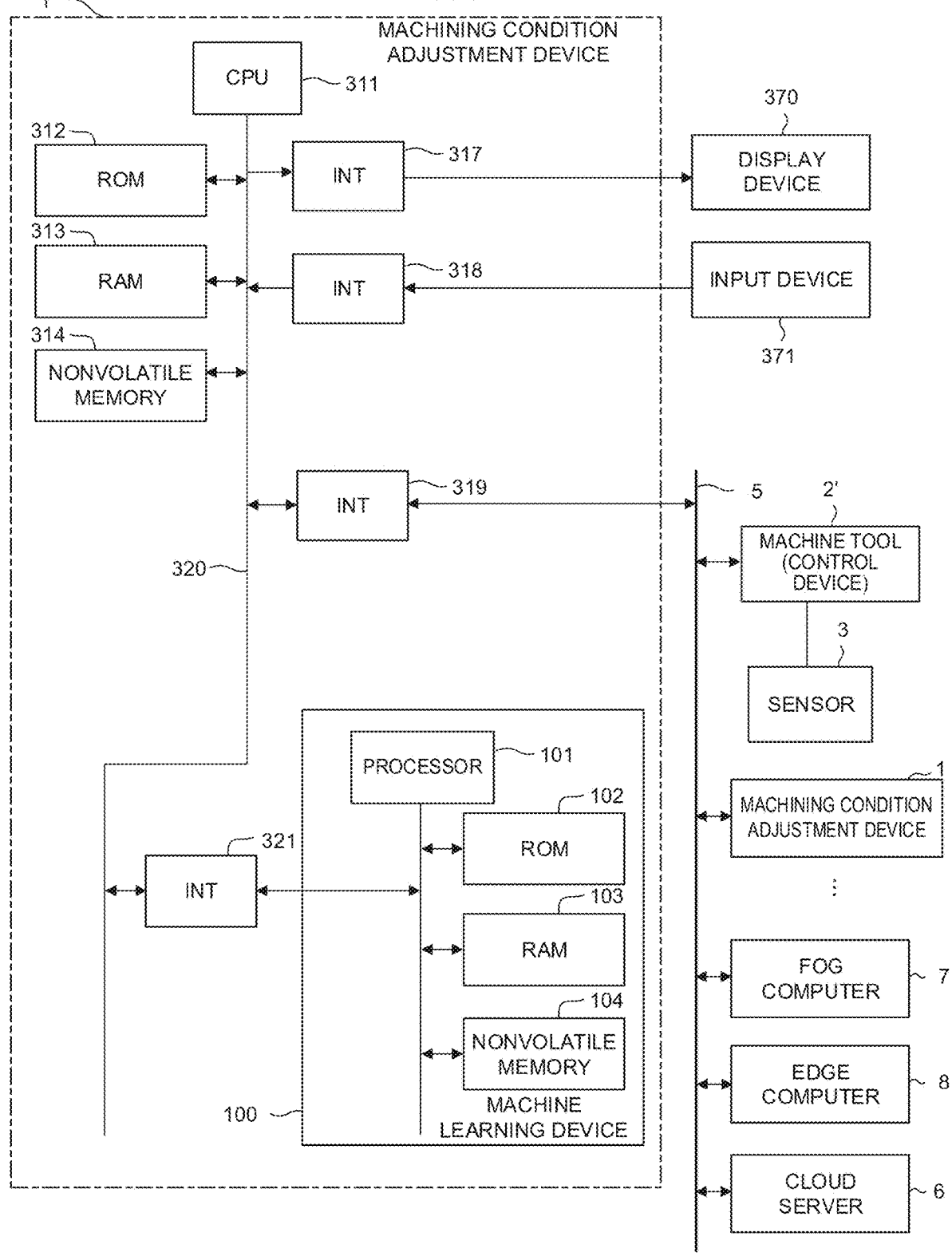
FIG. 9 is a schematic hardware configuration diagram of a machining condition adjustment device in a form implemented on a computer.

FIG. 9 is a schematic hardware configuration diagram in which the machining condition adjustment devices are implemented on computers such as the cloud server and the fog computers.

A CPU 311 included by a machining condition adjustment device 1' implemented on a computer according to the embodiment is a processor that generally controls the machining condition adjustment device 1'. The CPU 311 reads out system programs stored in a ROM 312 through a bus 320 and controls the whole machining condition adjustment device 1' in accordance with the system programs. Temporary calculation data, displayed data, various types of data inputted by an operator through an input unit not illustrated, or the like is temporarily stored in a RAM 313.

A nonvolatile memory 314 is configured as a memory whose storage status is retained through backup by a battery (not illustrated) or the like, for instance, even when the machining condition adjustment device 1' is powered off. Programs inputted through an input device 371 and various types of data acquired from units of the machining condition adjustment device 1' or through a network 5 from a machine tool 2' (and the sensors 3) or the like have been stored in the nonvolatile memory 314. The programs or the various types of data that are stored in the nonvolatile memory 314 may be expanded in the RAM 313 when executed/used. Various system programs (including system programs for controlling interaction with the machine learning device 100 that will be described later) such as publicly known analysis programs have been written in advance into the ROM 312.

The machining condition adjustment device 1' is connected through an interface 319 to the wired/wireless network 5. At least one machine tool 2' (machine tool including a control device), other machining condition adjustment devices 1, the edge computers 8, the fog computers 7, the cloud server 6, and the like are connected to the network 5 so as to exchange data with the machining condition adjustment device 1'.

On a display device 370, data read onto a memory or data obtained as a result of execution of a program or the like, for example, is outputted through an interface 317 so as to be displayed. The input device 371 made of a keyboard, a pointing device, or the like delivers an instruction, data, or the like based on operation by an operator, through an interface 318 to the CPU 311.

An interface 321 connects the machining condition adjustment device 1' and the machine learning device 100. The machine learning device 100 has a configuration similar to the configuration described with reference to FIG. 1.

In the configuration in which the machining condition adjustment device 1' is implemented on such a computer as a cloud server or a fog computer, functions the machining condition adjustment device 1' has are similar to the functions described in relation to the first to third embodiments, except that acquisition of information from the machine tool 2' and the sensors 3 and instructions to the machine tool 2 for the adjustment of the machining conditions are exchanged through the network 5. Therein, the machine tool 2' includes the control device and thus the control unit 32 included by the machining condition adjustment device 1' does not control the machine tool 2' but acquires information on a state of machining in the machine tool 2' from the control device included by the machine tool 2'. The control unit 32 included by the machining condition adjustment device 1' indirectly controls the sensors 3 through the control device included by the machine tool 2' and acquires measured values from the sensors 3 through the control device included by the machine tool 2'.

Figure 10:
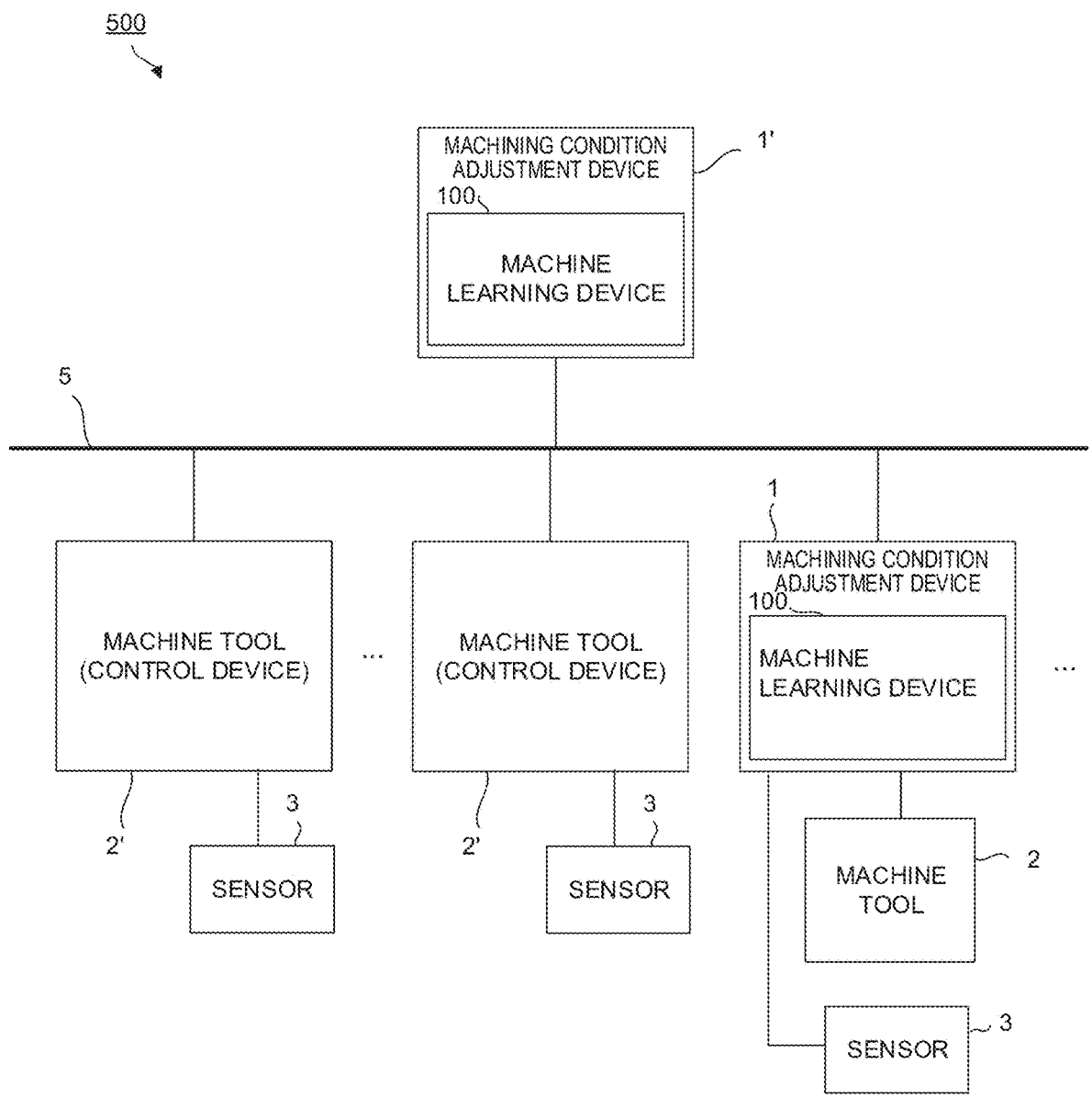
FIG. 10 is a schematic configuration diagram of a machining condition adjustment system according to a sixth embodiment.

FIG. 10 is a schematic configuration diagram of a machining condition adjustment system according to a sixth embodiment, including the machining condition adjustment device 1'. A machining condition adjustment system 500 includes a plurality of machining condition adjustment devices 1, 1', a plurality of machine tools 2', and the network 5 that makes connections among the machining condition adjustment devices 1, 1' and the machine tools 2'.

In the machining condition adjustment system 500, the machining condition adjustment device 1' including the machine learning device 100 determines machining conditions satisfying the priority condition, based on the state of machining by the machine tool 2', with use of a result of learning by the learning unit 110. At least one machining condition adjustment device 1' is configured so as to learn the machining conditions satisfying the priority conditions corresponding to the states of machining by the machine tools 2, 2' common to all the machining condition adjustment devices 1, 1', based on the state data S and the label data L or the determination data D that are acquired by each of a plurality of other machining condition adjustment devices 1, 1' and so as to share results of such learning among all the machining condition adjustment devices 1, 1'. According to the machining condition adjustment system 500, consequently, speed and reliability of the learning may be improved with use of a more diverse data set (including the state data S and the label data L or the determination data D) as input.

Figure 11:
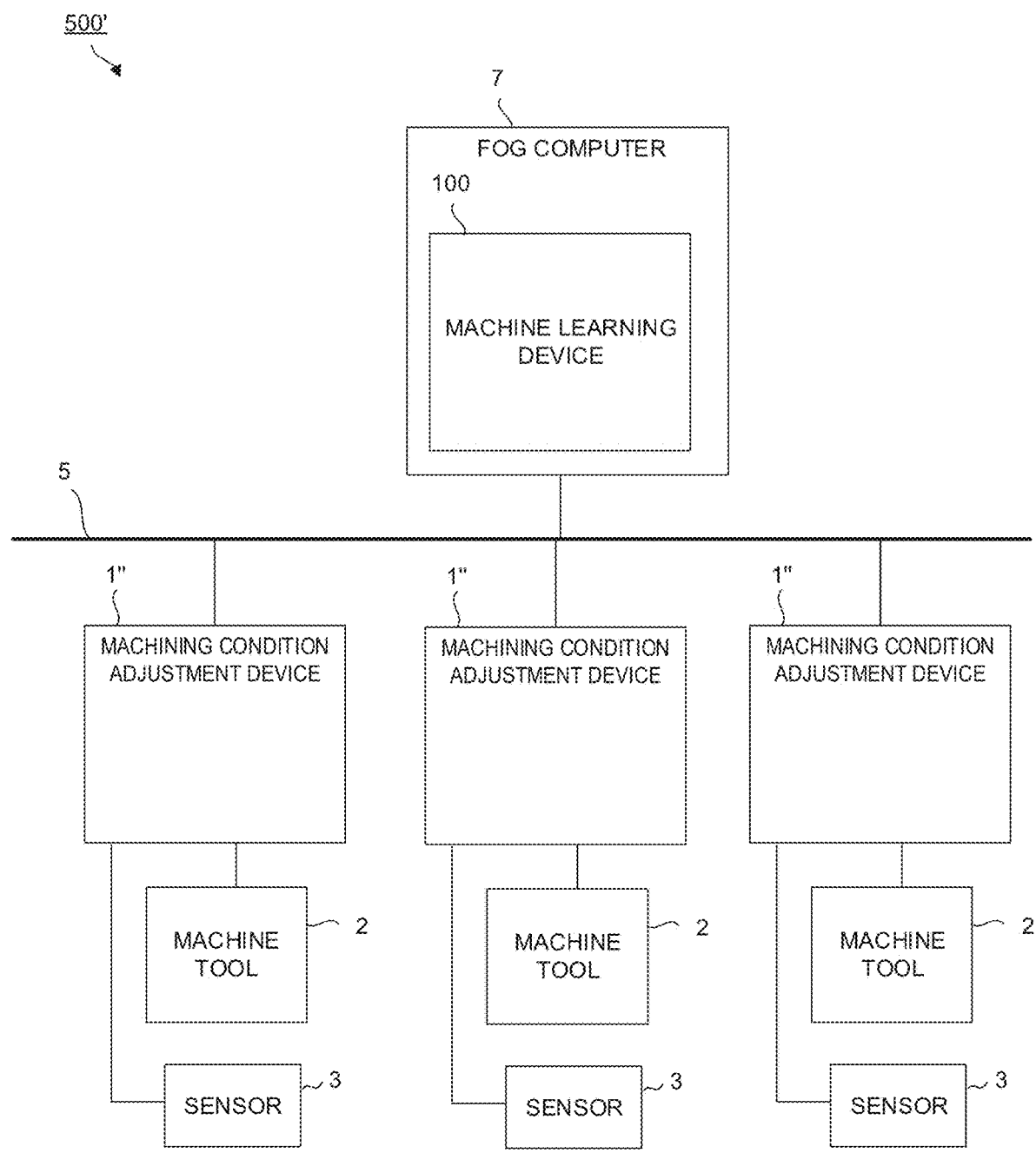
FIG. 11 is a schematic configuration diagram of a machining condition adjustment system according to a seventh embodiment.

FIG. 11 is a schematic configuration diagram of a system according to a seventh embodiment in which the machine learning device and the machining condition adjustment devices are implemented on different devices. A machining condition adjustment system 500' includes at least one machine learning device 100 implemented as a portion of a computer such as cloud server, host computer, or fog computer (FIG. 11 illustrates an example of implementation as a portion of the fog computer 7), a plurality of machining condition adjustment devices 1", and the network 5 that makes connections among the machining condition adjustment devices 1" and the computer. In a hardware configuration of the computer, hardware such as the CPU 311, the RAM 313, and the nonvolatile memory 314 included by a common computer is connected through the bus 320, as with the schematic hardware configuration of the machining condition adjustment device 1' illustrated in FIG. 9.

In the machining condition adjustment system 500' having the above configuration, the machine learning device 100 learns machining conditions satisfying the priority conditions corresponding to states of machining by the machine tools 2 common to all the machining condition adjustment devices 1", based on the state data S and the label data L or the determination data D that are acquired for each of the plurality of machining condition adjustment devices 1". The machining conditions for each machine tool 2 may be adjusted with use of results of such learning. According to the configuration of the machining condition adjustment system 500', the plurality of machining condition adjustment devices 1" are each capable of connecting a demanded number of machining condition adjustment devices 1" to the machine learning device 100 at demanded timing, irrespective of places where and periods when the machining condition adjustment devices 1" exist.

FIG. 12 is a schematic configuration diagram of a machining condition adjustment system 500" according to an eighth embodiment, including the machine learning devices 100' and the machining condition adjustment devices 1. The machining condition adjustment system 500" includes at least one machine learning device 100' implemented on a computer such as edge computer, fog computer, host computer, or cloud server (FIG. 12 illustrates an example of implementation as a portion of the fog computer 7), a plurality of machining condition adjustment devices 1, and the wired/wireless network 5 that makes connections among the machining condition adjustment devices 1 and the computer.

In the machining condition adjustment system 500" having the above configuration, the fog computer 7 including the machine learning device 100' acquires, from each of the machining condition adjustment devices 1, a learning model obtained as a result of machine learning by the machine learning device 100 included by each of the machining condition adjustment devices 1. The machine learning device 100' included by the fog computer 7 newly generates an optimized or streamlined learning model through optimization or streamlining processing for knowledge based on the plurality of learning models and distributes the generated learning model to the machining condition adjustment devices 1.

As an example of the optimization or streamlining of the learning model by the machine learning device 100', generation of a distilled model based on the plurality of learning models acquired from the machining condition adjustment devices 1 may be cited. In this example, the machine learning device 100' according to the embodiment produces input data to be inputted into the learning models and newly generates the distilled model that is a learning model by carrying out learning afresh with use of output obtained as a result of input of the input data into each learning model. As described above, the distilled model generated in this manner is utilized by being distributed to the machining condition adjustment devices 1 or other computers through an external storage medium or the network 5.

As another example of the optimization or streamlining of the learning model by the machine learning device 100', in a process of distillation for the plurality of learning models acquired from the machining condition adjustment devices 1, it may be conceived that a distribution of output data from each learning model in response to the input data is analyzed by a common statistical method, outliers in sets of the input data and the output data are extracted, and the distillation is performed with use of the sets of the input data and the output data having the outliers excluded. Through such a process, exceptional estimation results may be excluded from the sets of the input data and the output data obtained from each learning model and the distilled model may be generated with use of the sets of the input data and the output data having the exceptional estimation results excluded. The distilled model generated in this manner may be utilized as a more versatile learning model than the learning models generated by the plurality of machining condition adjustment devices 1.

Another common technique of the optimization or streamlining of a learning model (such as analysis of each learning model and optimization of hyperparameters of the learning model based on results of the analysis) may be introduced appropriately.

In operation of the machining condition adjustment system 500" according to the embodiment, for instance, the machine learning device 100' may be provided on the fog computer 7 provided for the plurality of machining condition adjustment devices 1 as the edge computers and the learning models generated respectively in the machining condition adjustment devices 1 may be aggregated and stored on the fog computer 7. After the optimization or streamlining based on the plurality of stored learning models, the optimized or streamlined learning model may be redistributed to the machining condition adjustment devices 1 as appropriate.

In the machining condition adjustment system 500" according to the embodiment, for instance, the learning models aggregated and stored on the fog computer 7 and the learning model optimized or streamlined on the fog computer 7 may be collected on a host computer or a cloud server on a still higher level and the learning models collected on the server may be used for application to intellectual work in a factory or a manufacturer of the machining condition adjustment devices 1. Examples of the application include construction and redistribution of a more versatile learning model in and from the higher-level server, support for maintenance work based on results of analysis of the learning models, analysis of performance or the like of each machining condition adjustment device 1, application to development of a new machine, and the like.

Though the embodiments of the invention have been described above, the invention is not limited to the examples of the embodiments described above and can be embodied in various manners with appropriate modification.

Though the machining condition adjustment device 1 and the machine learning device 100 are described as devices having different CPUs (processors) in relation to the above embodiments, for instance, the machine learning device 100 may be implemented by the CPU 11 included in the machining condition adjustment device 1 and the system programs stored in the ROM 12.

The invention claimed is:

1. A machining condition adjustment device that adjusts a machining condition for a machine tool to machine a workpiece, the machining condition adjustment device comprising:
    a data acquisition unit that acquires at least one piece of data indicating a state of machining including a machining type in the machine tool;
    a priority condition storage unit that stores priority condition data in which the machining type in the machine tool is associated with a priority condition for the machining type;
    a preprocessing unit that produces data to be used for machine learning, based on the data acquired by the data acquisition unit and the priority condition corresponding to the machining type included in the data and stored in the priority condition storage unit; and
    a machine learning device that carries out processing of the machine learning related to at least either of a machining condition and a machining parameter for machining by the machine tool in an environment where the workpiece is machined by the machine tool, based on the data produced by the preprocessing unit, wherein
    the machine learning device includes
        a learning model storage unit that stores a plurality of learning models generated for each machining type in the machine tool, and
        a learning model selection unit that selects a learning model to be used for the processing of the machine learning from among the plurality of learning models stored in the learning model storage unit, based on the machine type included in the data produced by the preprocessing unit.

2. The machining condition adjustment device according to claim 1, wherein
    based on the data acquired by the data acquisition unit, the preprocessing unit produces determination data based on the priority condition that corresponds to the machining type included in the data and that is stored in the priority condition storage unit and state data at least including tool data including information on a tool to be used for the machining of the workpiece by the machine tool and at least either of machining condition data including information on the machining condition in the machining of the workpiece by the machine tool and machining parameter data including information on the machining parameter in the machining of the workpiece by the machine tool, as data to be used for reinforcement learning by the machine learning device,
    the machine learning device includes
        a learning unit that generates a learning model in which the state of machining by the machine tool is associated with adjustment behavior for at least either of the machining condition and the machining parameter satisfying the priority condition, based on the state data and the determination data, and
        a decision making unit that determines at least either of the machining condition and the machining parameter satisfying the priority condition with use of the learning model generated by the learning unit, based on the state data, and
    the machine tool is controlled based on at least either of the machining condition and the machining parameter satisfying the priority condition determined by the decision making unit.

3. The machining condition adjustment device according to claim 1, wherein
    based on only the data acquired by the data acquisition unit and satisfying the priority condition that corresponds to the machining type included in the data and that is stored in the priority condition storage unit, the preprocessing unit produces state data at least including tool data including information on a tool to be used for the machining of the workpiece by the machine tool, and label data at least including at least either of machining condition label data labeled with the machining condition and machining parameter label data labeled with the machining parameter, as data to be used for supervised learning by the machine learning device, and
    the machine learning device includes a learning unit that generates a learning model in which the state of machining by the machine tool is associated with at least either of the machining condition and the machining parameter satisfying the priority condition, based on the state data and the label data.

4. The machining condition adjustment device according to claim 1, wherein
    based on the data acquired by the data acquisition unit, the preprocessing unit produces state data at least including tool data including information on a tool to be used for the machining of the workpiece by the machine tool, as data to be used for estimation by the machine learning device,
    the machine learning device includes an estimation unit that estimates at least either of the machining condition and the machining parameter satisfying the priority condition with use of the learning model selected by the learning model selection unit, based on the state data,
    the learning models stored in the learning model storage unit are the learning models in each of which the state of machining by the machine tool is associated with at least either of the machining condition and the machining parameter satisfying the priority condition, and the machine tool is controlled based on at least either of the machining condition and the machining parameter satisfying the priority condition estimated by the estimation unit.

5. The machining condition adjustment device according to claim 1, wherein based on only the data acquired by the data acquisition unit and satisfying the priority condition that corresponds to the machining type included in the data and that is stored in the priority condition storage unit, the preprocessing unit produces state data at least including tool data including information on a tool to be used for the machining of the workpiece by the machine tool and at least either of machining condition data including information on the machining condition in the machining of the workpiece by the machine tool and machining parameter data including information on the machining parameter in the machining of the workpiece by the machine tool, as data to be used for unsupervised learning by the machine learning device, and the machine learning device includes a learning unit that generates a learning model representing a distribution of at least either of the machining condition and the machining parameter satisfying the priority condition in the machining by the machine tool, based on the state data.

6. The machining condition adjustment device according to claim 1, wherein based on the data acquired by the data acquisition unit, the preprocessing unit produces state data at least including tool data including information on a tool to be used for the machining of the workpiece by the machine tool and machining condition data including information on the machining condition in the machining of the workpiece by the machine tool or machining parameter data including information on the machining parameter in the machining of the workpiece by the machine tool, as data to be used for estimation by the machine learning device, the machine learning device includes an estimation unit that estimates at least either of the machining condition and the machining parameter satisfying the priority condition, based on relation between the state data and the learning model selected by the learning model selection unit, the learning models stored in the learning model storage unit are the learning models each representing a distribution of at least either of the machining condition and the machining parameter satisfying the priority condition in the machining by the machine tool, and the machine tool is controlled based on at least either of the machining condition and the machining parameter satisfying the priority condition estimated by the estimation unit.

7. A machining condition adjustment system including a plurality of devices connected mutually through a network, wherein the plurality of devices include a first machining condition adjustment device that is the machining condition adjustment device according to claim 1.

8. The machining condition adjustment system according to claim 7, wherein the plurality of devices include a computer including a machine learning device, the computer acquires at least one of the learning models for the first machining condition adjustment device, and the machine learning device included by the computer carries out optimization or streamlining based on the acquired learning model.

9. The machining condition adjustment system according to claim 7, wherein the plurality of devices include a second machining condition adjustment device that is different from the first machining condition adjustment device, and a result of learning by the first machining condition adjustment device is shared with the second machining condition adjustment device.

10. The machining condition adjustment system according to claim 7, wherein the plurality of devices include a second machining condition adjustment device that is different from the first machining condition adjustment device, and data observed by the second machining condition adjustment device is available through the network for learning by the first machining condition adjustment device.

* * * * *